United States Patent
Meyer et al.

(10) Patent No.: US 12,443,286 B2
(45) Date of Patent: Oct. 14, 2025

(54) INPUT RECOGNITION BASED ON DISTINGUISHING DIRECT AND INDIRECT USER INTERACTIONS

(71) Applicant: Apple Inc., Cupertino, CA (US)

(72) Inventors: David J. Meyer, Menlo Park, CA (US); Julian K. Shutzberg, San Francisco, CA (US); David M. Teitelbaum, San Francisco, CA (US); Daniel J. Brewer, San Jose, CA (US); Bharat C. Dandu, Santa Clara, CA (US); Christopher D. McKenzie, Burlingame, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/375,280

(22) Filed: Sep. 29, 2023

(65) Prior Publication Data

US 2024/0402821 A1    Dec. 5, 2024

Related U.S. Application Data

(60) Provisional application No. 63/521,807, filed on Jun. 19, 2023, provisional application No. 63/470,565, filed on Jun. 2, 2023.

(51) Int. Cl.
   *G06F 3/01*    (2006.01)
(52) U.S. Cl.
   CPC .............. *G06F 3/017* (2013.01); *G06F 3/012* (2013.01); *G06F 3/013* (2013.01)

(58) Field of Classification Search
   CPC .......... G06F 3/017; G06F 3/012; G06F 3/013; G06F 3/011; G06F 3/0488; G06F 3/0481; G06F 3/04817; G06V 40/18; G06V 40/20
   See application file for complete search history.

(56) References Cited

U.S. PATENT DOCUMENTS

| | | |
|---|---|---|
| 1,173,824 A | 2/1916 | McKee |
| 5,515,488 A | 5/1996 | Hoppe |
| 5,524,195 A | 6/1996 | Clanton, III |
| 5,610,828 A | 3/1997 | Kodosky |
| 5,737,553 A | 4/1998 | Bartok |

(Continued)

FOREIGN PATENT DOCUMENTS

| | | |
|---|---|---|
| CA | 3033344 A1 | 2/2018 |
| CN | 104714771 A | 6/2015 |

(Continued)

OTHER PUBLICATIONS

U.S. Patent and Trademark Office, Non-Final Office Action, U.S. Appl. No. 18/244,570, 33 pages, May 29, 2024.

(Continued)

*Primary Examiner* — Grant Sitta
(74) *Attorney, Agent, or Firm* — Thompson Hine LLP

(57) ABSTRACT

Various implementations disclosed herein include devices, systems, and methods that interpret user activity as user interactions with user interface (UI) elements positioned within a three-dimensional (3D) space such as an extended reality (XR) environment. Some implementations enable user interactions with virtual elements displayed in 3D environments that utilize alternative input modalities, e.g., XR environments that interpret user activity as either direct interactions or indirect interactions with virtual elements.

23 Claims, 9 Drawing Sheets

(56) References Cited

U.S. PATENT DOCUMENTS

| | | |
|---|---|---|
| 5,740,440 A | 4/1998 | West |
| 5,751,287 A | 5/1998 | Hahn |
| 5,758,122 A | 5/1998 | Corda |
| 5,794,178 A | 8/1998 | Caid |
| 5,877,766 A | 3/1999 | Bates |
| 5,900,849 A | 5/1999 | Gallery |
| 5,933,143 A | 8/1999 | Kobayashi |
| 5,990,886 A | 11/1999 | Serdy |
| 6,061,060 A | 5/2000 | Berry |
| 6,108,004 A | 8/2000 | Medl |
| 6,112,015 A | 8/2000 | Planas |
| 6,154,559 A | 11/2000 | Beardsley |
| 6,456,296 B1 | 9/2002 | Cataudella |
| 6,584,465 B1 | 6/2003 | Zhu |
| 6,756,997 B1 | 6/2004 | Ward, III |
| 7,035,903 B1 | 4/2006 | Baldonado |
| 7,137,074 B1 | 11/2006 | Newton |
| 7,230,629 B2 | 6/2007 | Reynolds |
| 8,793,620 B2 | 7/2014 | Stafford |
| 8,803,873 B2 | 8/2014 | Yoo |
| 8,947,323 B1 | 2/2015 | Raffle |
| 8,970,478 B2 | 3/2015 | Johansson |
| 8,970,629 B2 | 3/2015 | Kim |
| 8,994,718 B2 | 3/2015 | Latta |
| 9,007,301 B1 | 4/2015 | Raffle |
| 9,185,062 B1 | 11/2015 | Yang |
| 9,201,500 B2 | 12/2015 | Srinivasan |
| 9,256,785 B2 | 2/2016 | Qvarfordt |
| 9,292,184 B2 * | 3/2016 | Hosenpud ........... G06F 3/04815 |
| 9,400,559 B2 | 7/2016 | Latta |
| 9,448,635 B2 | 9/2016 | MacDougall |
| 9,465,479 B2 | 10/2016 | Cho |
| 9,526,127 B1 | 12/2016 | Taubman |
| 9,563,331 B2 | 2/2017 | Poulos |
| 9,575,559 B2 | 2/2017 | Andrysco |
| 9,681,112 B2 | 6/2017 | Son |
| 9,684,372 B2 | 6/2017 | Xun |
| 9,734,402 B2 | 8/2017 | Jang |
| 9,778,814 B2 | 10/2017 | Ambrus |
| 9,851,866 B2 | 12/2017 | Goossens |
| 9,886,087 B1 | 2/2018 | Wald |
| 9,910,506 B2 * | 3/2018 | Spiessl ............... G02B 27/0172 |
| 9,933,833 B2 | 4/2018 | Tu |
| 9,934,614 B2 | 4/2018 | Ramsby |
| 10,049,460 B2 | 8/2018 | Romano |
| 10,203,764 B2 | 2/2019 | Katz |
| 10,307,671 B2 | 6/2019 | Barney |
| 10,353,532 B1 | 7/2019 | Holz |
| 10,394,320 B2 | 8/2019 | George-Svahn |
| 10,534,439 B2 | 1/2020 | Raffa |
| 10,664,048 B2 | 5/2020 | Cieplinski |
| 10,664,050 B2 | 5/2020 | Alcaide |
| 10,699,488 B1 | 6/2020 | Terrano |
| 10,732,721 B1 | 8/2020 | Clements |
| 10,754,434 B2 | 8/2020 | Hall |
| 10,768,693 B2 | 9/2020 | Powderly |
| 10,861,242 B2 | 12/2020 | Lacey |
| 10,890,967 B2 * | 1/2021 | Stellmach ............... G06F 3/013 |
| 10,956,724 B1 | 3/2021 | Terrano |
| 10,983,663 B2 | 4/2021 | Iglesias |
| 11,055,920 B1 | 7/2021 | Bramwell |
| 11,112,875 B1 | 9/2021 | Zhou |
| 11,199,898 B2 | 12/2021 | Blume |
| 11,200,742 B1 | 12/2021 | Post |
| 11,262,840 B2 | 3/2022 | Bychkov et al. |
| 11,294,472 B2 | 4/2022 | Tang |
| 11,294,475 B1 | 4/2022 | Pinchon |
| 11,340,756 B2 | 5/2022 | Faulkner |
| 11,348,300 B2 | 5/2022 | Zimmermann |
| 11,461,973 B2 | 10/2022 | Pinchon |
| 11,573,363 B2 | 2/2023 | Zou |
| 11,573,631 B2 | 2/2023 | Cederlund et al. |
| 11,574,452 B2 | 2/2023 | Berliner |
| 11,720,171 B2 | 8/2023 | Pastrana Vicente |
| 11,726,577 B2 | 8/2023 | Katz |
| 11,733,824 B2 | 8/2023 | Iskandar |
| 11,762,457 B1 | 9/2023 | Ikkai |
| 12,053,308 B2 | 8/2024 | Alcaide |
| 12,067,688 B2 * | 8/2024 | Goncalves ............. G06T 19/20 |
| 12,099,653 B2 | 9/2024 | Chawda |
| 12,118,200 B1 | 10/2024 | Shutzberg |
| 12,164,739 B2 * | 12/2024 | Pastrana Vicente .... G06F 3/013 |
| 12,164,741 B2 * | 12/2024 | De Almeida E De Vincenzo ...... G06T 19/006 |
| 2001/0047250 A1 | 11/2001 | Schuller |
| 2002/0044152 A1 | 4/2002 | Abbott |
| 2003/0151611 A1 | 8/2003 | Turpin |
| 2003/0222924 A1 | 12/2003 | Baron |
| 2004/0059784 A1 | 3/2004 | Caughey |
| 2004/0243926 A1 | 12/2004 | Trenbeath |
| 2005/0100210 A1 | 5/2005 | Rice |
| 2005/0138572 A1 | 6/2005 | Good |
| 2005/0144570 A1 | 6/2005 | Loverin |
| 2005/0144571 A1 | 6/2005 | Loverin |
| 2005/0198143 A1 | 9/2005 | Moody |
| 2006/0080702 A1 | 4/2006 | Diez |
| 2006/0283214 A1 | 12/2006 | Donadon |
| 2008/0211771 A1 | 9/2008 | Richardson |
| 2009/0064035 A1 | 3/2009 | Shibata |
| 2009/0231356 A1 | 9/2009 | Barnes |
| 2010/0097375 A1 | 4/2010 | Tadaishi |
| 2010/0150526 A1 | 6/2010 | Rose |
| 2010/0188503 A1 | 7/2010 | Tsai |
| 2011/0018895 A1 | 1/2011 | Buzyn |
| 2011/0018896 A1 | 1/2011 | Buzyn |
| 2011/0216060 A1 | 9/2011 | Weising |
| 2011/0254865 A1 | 10/2011 | Yee |
| 2011/0310001 A1 | 12/2011 | Madau |
| 2012/0086624 A1 | 4/2012 | Thompson |
| 2012/0113223 A1 * | 5/2012 | Hilliges .................. G06F 3/011 348/46 |
| 2012/0151416 A1 | 6/2012 | Bell |
| 2012/0170840 A1 | 7/2012 | Caruso |
| 2012/0218395 A1 | 8/2012 | Andersen |
| 2012/0257035 A1 | 10/2012 | Larsen |
| 2013/0127850 A1 | 5/2013 | Bindon |
| 2013/0154913 A1 | 6/2013 | Genc et al. |
| 2013/0211843 A1 | 8/2013 | Clarkson |
| 2013/0229345 A1 | 9/2013 | Day |
| 2013/0271397 A1 | 10/2013 | MacDougall |
| 2013/0278501 A1 | 10/2013 | Bulzacki |
| 2013/0283213 A1 | 10/2013 | Guendelman et al. |
| 2013/0286004 A1 | 10/2013 | McCulloch |
| 2013/0307775 A1 | 11/2013 | Raynor |
| 2013/0326364 A1 | 12/2013 | Latta |
| 2013/0342564 A1 | 12/2013 | Kinnebrew |
| 2013/0342570 A1 | 12/2013 | Kinnebrew |
| 2014/0002338 A1 | 1/2014 | Raffa |
| 2014/0028548 A1 | 1/2014 | Bychkov |
| 2014/0075361 A1 | 3/2014 | Reynolds |
| 2014/0078176 A1 * | 3/2014 | Kim ....................... G06F 3/011 345/633 |
| 2014/0108942 A1 | 4/2014 | Freeman |
| 2014/0125584 A1 | 5/2014 | Xun |
| 2014/0168261 A1 * | 6/2014 | Margolis ............... H04N 13/344 345/633 |
| 2014/0184496 A1 | 7/2014 | Gribetz |
| 2014/0184644 A1 | 7/2014 | Sharma |
| 2014/0198017 A1 | 7/2014 | Lamb |
| 2014/0201689 A1 | 7/2014 | Bedikian |
| 2014/0258942 A1 | 9/2014 | Kutliroff |
| 2014/0282272 A1 | 9/2014 | Kies |
| 2014/0320404 A1 | 10/2014 | Kasahara |
| 2014/0347391 A1 | 11/2014 | Keane |
| 2015/0035822 A1 | 2/2015 | Arsan |
| 2015/0035832 A1 | 2/2015 | Sugden |
| 2015/0042679 A1 | 2/2015 | Järvenpää |
| 2015/0062004 A1 | 3/2015 | Rafii |
| 2015/0067580 A1 | 3/2015 | Um |
| 2015/0123890 A1 | 5/2015 | Kapur |
| 2015/0130740 A1 * | 5/2015 | Cederlund ............. G02B 27/01 345/173 |
| 2015/0153833 A1 | 6/2015 | Pinault et al. |

(56) References Cited

U.S. PATENT DOCUMENTS

| | | | |
|---|---|---|---|
| 2015/0169176 A1* | 6/2015 | Cohen | G06F 3/017 715/852 |
| 2015/0177937 A1 | 6/2015 | Poletto | |
| 2015/0187093 A1 | 7/2015 | Chu | |
| 2015/0205106 A1 | 7/2015 | Norden | |
| 2015/0205358 A1* | 7/2015 | Lyren | G06F 3/04883 715/765 |
| 2015/0220152 A1 | 8/2015 | Tait | |
| 2015/0227285 A1 | 8/2015 | Lee | |
| 2015/0242095 A1 | 8/2015 | Sonnenberg | |
| 2015/0317832 A1 | 11/2015 | Ebstyne | |
| 2015/0331576 A1 | 11/2015 | Piya | |
| 2015/0332075 A1 | 11/2015 | Burch | |
| 2015/0332091 A1 | 11/2015 | Kim | |
| 2015/0338914 A1 | 11/2015 | Andrysco | |
| 2015/0370323 A1 | 12/2015 | Cieplinski | |
| 2016/0015470 A1 | 1/2016 | Border | |
| 2016/0018898 A1 | 1/2016 | Tu | |
| 2016/0018900 A1 | 1/2016 | Tu | |
| 2016/0025971 A1 | 1/2016 | Crow | |
| 2016/0026242 A1 | 1/2016 | Burns et al. | |
| 2016/0026253 A1 | 1/2016 | Bradski | |
| 2016/0062636 A1 | 3/2016 | Jung | |
| 2016/0093108 A1 | 3/2016 | Mao | |
| 2016/0098094 A1 | 4/2016 | Minkkinen | |
| 2016/0170603 A1 | 6/2016 | Bastien | |
| 2016/0171304 A1 | 6/2016 | Golding | |
| 2016/0179336 A1 | 6/2016 | Ambrus | |
| 2016/0196692 A1 | 7/2016 | Kjallstrom | |
| 2016/0239080 A1 | 8/2016 | Marcolina et al. | |
| 2016/0253063 A1 | 9/2016 | Critchlow | |
| 2016/0253821 A1 | 9/2016 | Romano | |
| 2016/0275702 A1 | 9/2016 | Reynolds | |
| 2016/0306434 A1 | 10/2016 | Ferrin | |
| 2016/0313890 A1 | 10/2016 | Walline | |
| 2016/0334875 A1 | 11/2016 | Kandadai | |
| 2016/0379409 A1 | 12/2016 | Gavriliuc | |
| 2017/0038829 A1 | 2/2017 | Lanier | |
| 2017/0038837 A1 | 2/2017 | Faaborg | |
| 2017/0038849 A1 | 2/2017 | Hwang | |
| 2017/0039770 A1 | 2/2017 | Lanier | |
| 2017/0046872 A1 | 2/2017 | Geselowitz | |
| 2017/0060230 A1* | 3/2017 | Faaborg | G06F 3/017 |
| 2017/0123487 A1 | 5/2017 | Hazra | |
| 2017/0131964 A1 | 5/2017 | Baek | |
| 2017/0132694 A1 | 5/2017 | Damy | |
| 2017/0132822 A1 | 5/2017 | Marschke | |
| 2017/0153866 A1 | 6/2017 | Grinberg | |
| 2017/0206691 A1 | 7/2017 | Harrises | |
| 2017/0228130 A1 | 8/2017 | Palmaro | |
| 2017/0285737 A1 | 10/2017 | Khalid | |
| 2017/0287225 A1 | 10/2017 | Powderly | |
| 2017/0315715 A1 | 11/2017 | Fujita | |
| 2017/0344223 A1 | 11/2017 | Holzer | |
| 2017/0358141 A1 | 12/2017 | Stafford | |
| 2018/0059928 A1 | 3/2018 | Westerman et al. | |
| 2018/0075658 A1 | 3/2018 | Lanier | |
| 2018/0081519 A1 | 3/2018 | Kim | |
| 2018/0095634 A1 | 4/2018 | Alexander | |
| 2018/0095635 A1 | 4/2018 | Valdivia | |
| 2018/0101223 A1 | 4/2018 | Ishihara | |
| 2018/0114364 A1 | 4/2018 | McPhee | |
| 2018/0150997 A1 | 5/2018 | Austin | |
| 2018/0158222 A1 | 6/2018 | Hayashi | |
| 2018/0181199 A1 | 6/2018 | Harvey | |
| 2018/0188802 A1 | 7/2018 | Okumura | |
| 2018/0210628 A1 | 7/2018 | McPhee | |
| 2018/0239144 A1 | 8/2018 | Woods | |
| 2018/0300023 A1 | 10/2018 | Hein | |
| 2018/0307303 A1* | 10/2018 | Powderly | G06F 3/017 |
| 2018/0315248 A1 | 11/2018 | Bastov | |
| 2018/0322701 A1* | 11/2018 | Pahud | G06F 3/038 |
| 2018/0348861 A1 | 12/2018 | Uscinski | |
| 2019/0034076 A1 | 1/2019 | Vinayak | |
| 2019/0050062 A1* | 2/2019 | Chen | G06T 7/70 |
| 2019/0073109 A1 | 3/2019 | Zhang | |
| 2019/0080572 A1 | 3/2019 | Kim | |
| 2019/0088149 A1 | 3/2019 | Fink | |
| 2019/0094963 A1 | 3/2019 | Nijs | |
| 2019/0094979 A1 | 3/2019 | Hall | |
| 2019/0101991 A1 | 4/2019 | Brennan | |
| 2019/0130633 A1 | 5/2019 | Haddad | |
| 2019/0130733 A1 | 5/2019 | Hodge | |
| 2019/0146128 A1 | 5/2019 | Cao | |
| 2019/0204906 A1 | 7/2019 | Ross | |
| 2019/0227763 A1 | 7/2019 | Kaufthal | |
| 2019/0258320 A1* | 8/2019 | Yang | G06F 3/04815 |
| 2019/0258365 A1 | 8/2019 | Zurmoehle | |
| 2019/0310757 A1 | 10/2019 | Lee | |
| 2019/0324529 A1 | 10/2019 | Stellmach | |
| 2019/0324531 A1* | 10/2019 | Eraslan | G06F 21/32 |
| 2019/0339770 A1 | 11/2019 | Kurlethimar | |
| 2019/0346922 A1 | 11/2019 | Young | |
| 2019/0362557 A1 | 11/2019 | Lacey | |
| 2019/0371072 A1 | 12/2019 | Lindberg | |
| 2019/0377487 A1 | 12/2019 | Bailey | |
| 2019/0379765 A1 | 12/2019 | Fajt | |
| 2019/0384406 A1 | 12/2019 | Smith | |
| 2020/0004401 A1 | 1/2020 | Hwang | |
| 2020/0012341 A1 | 1/2020 | Stellmach | |
| 2020/0043243 A1 | 2/2020 | Bhushan | |
| 2020/0082602 A1 | 3/2020 | Jones | |
| 2020/0089314 A1 | 3/2020 | Poupyrev | |
| 2020/0098140 A1 | 3/2020 | Jagnow | |
| 2020/0098173 A1 | 3/2020 | McCall | |
| 2020/0117213 A1 | 4/2020 | Tian | |
| 2020/0129850 A1 | 4/2020 | Ohashi | |
| 2020/0142495 A1* | 5/2020 | Steinberg | G06V 40/18 |
| 2020/0159017 A1 | 5/2020 | Lin | |
| 2020/0225747 A1 | 7/2020 | Bar-Zeev | |
| 2020/0225757 A1 | 7/2020 | Schwarz | |
| 2020/0225830 A1* | 7/2020 | Tang | G06F 3/011 |
| 2020/0226814 A1 | 7/2020 | Tang | |
| 2020/0337653 A1 | 10/2020 | Alcaide | |
| 2020/0356221 A1 | 11/2020 | Behzadi | |
| 2020/0357374 A1 | 11/2020 | Verweij | |
| 2020/0387228 A1 | 12/2020 | Ravasz | |
| 2021/0064142 A1 | 3/2021 | Stern et al. | |
| 2021/0074062 A1 | 3/2021 | Madonna | |
| 2021/0090337 A1 | 3/2021 | Ravasz | |
| 2021/0096726 A1 | 4/2021 | Faulkner | |
| 2021/0141525 A1 | 5/2021 | Piemonte et al. | |
| 2021/0191600 A1 | 6/2021 | Lemay | |
| 2021/0263593 A1 | 8/2021 | Lacey | |
| 2021/0295602 A1 | 9/2021 | Scapel | |
| 2021/0303074 A1 | 9/2021 | Vanblon | |
| 2021/0319617 A1 | 10/2021 | Ahn | |
| 2021/0327140 A1 | 10/2021 | Rothkopf | |
| 2021/0339134 A1 | 11/2021 | Knoppert | |
| 2021/0350564 A1 | 11/2021 | Peuhkurinen | |
| 2021/0357073 A1 | 11/2021 | Kandadai et al. | |
| 2021/0374443 A1 | 12/2021 | Edwards | |
| 2021/0375022 A1 | 12/2021 | Lee | |
| 2022/0011855 A1 | 1/2022 | Hazra | |
| 2022/0030197 A1 | 1/2022 | Ishimoto | |
| 2022/0050432 A1 | 2/2022 | Kim | |
| 2022/0083197 A1 | 3/2022 | Rockel | |
| 2022/0092862 A1 | 3/2022 | Faulkner | |
| 2022/0101593 A1 | 3/2022 | Rockel | |
| 2022/0101612 A1 | 3/2022 | Palangie | |
| 2022/0104910 A1 | 4/2022 | Shelton, IV | |
| 2022/0121344 A1 | 4/2022 | Pastrana Vicente | |
| 2022/0130107 A1 | 4/2022 | Lindh | |
| 2022/0137705 A1 | 5/2022 | Hashimoto | |
| 2022/0157083 A1 | 5/2022 | Jandhyala | |
| 2022/0187907 A1 | 6/2022 | Lee | |
| 2022/0191570 A1 | 6/2022 | Reid | |
| 2022/0229524 A1 | 7/2022 | McKenzie | |
| 2022/0229534 A1 | 7/2022 | Terre | |
| 2022/0236795 A1 | 7/2022 | Jonker | |
| 2022/0245888 A1 | 8/2022 | Singh | |
| 2022/0253149 A1* | 8/2022 | Berliner | G06F 3/04883 |
| 2022/0276720 A1* | 9/2022 | Yasui | G06T 7/20 |
| 2022/0326837 A1 | 10/2022 | Dessero | |

(56) References Cited

U.S. PATENT DOCUMENTS

| | | |
|---|---|---|
| 2022/0375269 A1* | 11/2022 | Wu .................... G06V 40/28 |
| 2022/0413691 A1 | 12/2022 | Becker |
| 2022/0414999 A1 | 12/2022 | Ravasz |
| 2023/0004216 A1 | 1/2023 | Rodgers |
| 2023/0008537 A1 | 1/2023 | Henderson |
| 2023/0068660 A1 | 3/2023 | Brent |
| 2023/0069764 A1 | 3/2023 | Renee |
| 2023/0074080 A1 | 3/2023 | Miller |
| 2023/0093979 A1 | 3/2023 | Stauber |
| 2023/0133579 A1 | 5/2023 | Yuhu |
| 2023/0152935 A1 | 5/2023 | McKenzie |
| 2023/0154122 A1 | 5/2023 | Dascola |
| 2023/0163987 A1 | 5/2023 | Young |
| 2023/0168788 A1 | 6/2023 | Faulkner |
| 2023/0185426 A1 | 6/2023 | Philipp |
| 2023/0186577 A1 | 6/2023 | Philipp |
| 2023/0244316 A1 | 8/2023 | Schwarz |
| 2023/0244857 A1 | 8/2023 | Weiss |
| 2023/0273706 A1 | 8/2023 | Smith |
| 2023/0274504 A1 | 8/2023 | Ren |
| 2023/0305635 A1* | 9/2023 | Han .................... G06F 3/04847 |
| 2023/0308610 A1 | 9/2023 | Henderson |
| 2023/0315385 A1 | 10/2023 | Akmal |
| 2023/0316634 A1 | 10/2023 | Shih-Sang |
| 2023/0325004 A1 | 10/2023 | Burns |
| 2023/0350539 A1 | 11/2023 | Owen |
| 2023/0384907 A1 | 11/2023 | Boesel |
| 2024/0086031 A1 | 3/2024 | Palangie |
| 2024/0086032 A1 | 3/2024 | Palangie |
| 2024/0087256 A1 | 3/2024 | Hylak |
| 2024/0094863 A1 | 3/2024 | Smith |
| 2024/0095984 A1 | 3/2024 | Ren |
| 2024/0103613 A1 | 3/2024 | Chawda |
| 2024/0103684 A1 | 3/2024 | Yu |
| 2024/0103707 A1 | 3/2024 | Henderson |
| 2024/0104836 A1 | 3/2024 | Dessero |
| 2024/0104877 A1 | 3/2024 | Henderson |
| 2024/0111479 A1 | 4/2024 | Paul |
| 2024/0221291 A1 | 7/2024 | Henderson |
| 2024/0393876 A1 | 11/2024 | Chawda |
| 2024/0402800 A1 | 12/2024 | Shutzberg |
| 2024/0411444 A1 | 12/2024 | Shutzberg |

FOREIGN PATENT DOCUMENTS

| | | |
|---|---|---|
| CN | 105264461 A | 1/2016 |
| CN | 105264478 A | 1/2016 |
| CN | 108633307 A | 10/2018 |
| CN | 109491508 B | 3/2019 |
| CN | 110476142 A | 11/2019 |
| CN | 110673718 A | 1/2020 |
| EP | 2741175 A2 | 6/2014 |
| EP | 2947545 A1 | 11/2015 |
| EP | 3503101 A1 | 6/2019 |
| EP | 3588255 A1 | 1/2020 |
| EP | 3654147 A1 | 5/2020 |
| JP | H1051711 A | 2/1998 |
| JP | 2005215144 A | 8/2005 |
| JP | 2012234550 A | 11/2012 |
| JP | 2013196158 A | 9/2013 |
| JP | 2013257716 A | 12/2013 |
| JP | 2014514652 A | 6/2014 |
| JP | 2015515040 A | 5/2015 |
| JP | 2015118332 A | 6/2015 |
| JP | 2016194744 A | 11/2016 |
| JP | 2017027206 A | 2/2017 |
| JP | 2018005516 A | 1/2018 |
| JP | 2019169154 A | 10/2019 |
| JP | 2022053334 A | 4/2022 |
| KR | 1020160012139 A | 2/2016 |
| KR | 20190100957 A | 8/2019 |
| WO | 2019142560 A1 | 7/2019 |
| WO | 2019217163 A1 | 11/2019 |
| WO | 2020066682 A1 | 4/2020 |
| WO | 2021173839 A1 | 9/2021 |
| WO | 2021202783 A1 | 10/2021 |
| WO | 2022046340 A1 | 3/2022 |
| WO | 2022055822 A1 | 3/2022 |
| WO | 2022066399 A1 | 3/2022 |
| WO | 2022164881 A1 | 8/2022 |
| WO | 2023141535 A1 | 7/2023 |

OTHER PUBLICATIONS

U.S. Patent and Trademark Office, Corrected Notice of Allowability received for U.S. Appl. No. 17/448,875, 4 pages, Apr. 24, 2024.
U.S. Patent and Trademark Office, Corrected Notice of Allowability received for U.S. Appl. No. 17/659,147, 6 pages, Feb. 14, 2024.
U.S. Patent and Trademark Office, Corrected Notice of Allowability received for U.S. Appl. No. 17/932,655, 2 pages, Oct. 12, 2023.
U.S. Patent and Trademark Office, Corrected Notice of Allowability received for U.S. Appl. No. 18/465,098, 3 pages, Mar. 13, 2024.
European Patent Office, European Search Report received for European Patent Application No. 21791153.6, 5 pages, Mar. 22, 2024.
European Patent Office, Extended European Search Report received for European Patent Application No. 23197572.3, 7 pages, Feb. 19, 2024.
U.S. Patent and Trademark Office, Final Office Action received for U.S. Appl. No. 17/580,495, 29 pages, May 13, 2024.
U.S. Patent and Trademark Office, Final Office Action received for U.S. Appl. No. 17/659,147, 17 pages,, Oct. 4, 2023.
European Patent Office (ISA/EP), International Search Report received for International Patent Application No. PCT/US2021/071596, 7 pages, Apr. 8, 2022.
European Patent Office (ISA/EP), International Search Report received for International Patent Application No. PCT/US2022/071704, 6 pages, Aug. 26, 2022.
European Patent Office (ISA/EP), International Search Report received for PCT Patent Application No. PCT/US2023/074257, 5 pages, Nov. 21, 2023.
European Patent Office (ISA/EP), International Search Report received for International Patent Application No. PCT/US2023/074950, 9 pages, Jan. 3, 2024.
European Patent Office (ISA/EP), International Search Report received for International Patent Application No. PCT/US2023/074979, 6 pages, Feb. 26, 2024.
U.S. Patent and Trademark Office, Non-Final Office Action received for U.S. Appl. No. 17/659,147, 19 pages, Mar. 16, 2023.
U.S. Patent and Trademark Office, Non-Final Office Action received for U.S. Appl. No. 17/932,655, 10 pages, Apr. 20, 2023.
U.S. Patent and Trademark Office, Non-Final Office Action received for U.S. Appl. No. 17/932,999, 22 pages, Feb. 23, 2024.
U.S. Patent and Trademark Office, Non-Final Office Action received for U.S. Appl. No. 18/157,040, 25 pages, May 2, 2024.
U.S. Patent and Trademark Office, Notice of Allowance received for U.S. Appl. No. 17/448,875, 8 pages, Apr. 17, 2024.
U.S. Patent and Trademark Office, Notice of Allowance received for U.S. Appl. No. 17/448,876, 9 pages, Apr. 7, 2022.
U.S. Patent and Trademark Office, Notice of Allowance received for U.S. Appl. No. 17/448,876, 8 pages, Jul. 20, 2022.
U.S. Patent and Trademark Office, Notice of Allowance received for U.S. Appl. No. 17/659,147, 13 pages, Jan. 26, 2024.
U.S. Patent and Trademark Office, Notice of Allowance received for U.S. Appl. No. 17/932,655, 7 pages, Jan. 24, 2024.
U.S. Patent and Trademark Office, Notice of Allowance received for U.S. Appl. No. 17/932,655, 7 pages, Sep. 29, 2023.
U.S. Patent and Trademark Office, Notice of Allowance received for U.S. Appl. No. 18/154,757, 12 pages, May 10, 2024.
U.S. Patent and Trademark Office, Notice of Allowance received for U.S. Appl. No. 18/421,675, 9 pages, Apr. 11, 2024.
U.S. Patent and Trademark Office, Notice of Allowance received for U.S. Appl. No. 18/463,739, 10 pages, Feb. 1, 2024.
U.S. Patent and Trademark Office, Notice of Allowance received for U.S. Appl. No. 18/463,739, 11 pages, Oct. 30, 2023.
U.S. Patent and Trademark Office, Notice of Allowance received for U.S. Appl. No. 18/465,098, 6 pages, Mar. 4, 2024.
U.S. Patent and Trademark Office, Notice of Allowance received for

(56) References Cited

OTHER PUBLICATIONS

U.S. Appl. No. 18/465,098, 8 pages, Nov. 17, 2023.
National Intellectual Property Administration of the People's Republic of China, Search Report (with English translation) received for Chinese Patent Application No. 202310873465.7, 5 pages, Feb. 1, 2024.
"AquaSnap Window Manager: dock, snap, tile, organize," Nurgo Software, Available online at: https://www.nurgo-software.com/products/aquasnap, 5 pages, retrieved on Jun. 27, 2023.
United States Patent and Trademark Office, Corrected Notice of Allowance, U.S. Appl. No. 17/478,593, 2 pages, Dec. 21, 2022.
European Patent Office, Extended European Search Report, European Patent Application No. 23158818.7, 12 pages, Jul. 3, 2023.
European Patent Office, Extended European Search Report, European Patent Application No. 23158929.2, 12 pages, Jun. 27, 2023.
U.S. Patent and Trademark Office, Final Office Action, U.S. Appl. No. 17/448,875, 24 pages, Mar. 16, 2023.
Home | Virtual Desktop, Virtual Desktop, Available online at https://www.vrdesktop.net, 4 pages, retrieved Jun. 29, 2023.
European Patent Office (ISA/EP), International Search Report, International Application No. PCT/US2022/076603, 4 pages, Jan. 9, 2023.
European Patent Office (ISA/EP), International Search Report, International Application No. PCT/US2023/017335, 6 pages, Aug. 22, 2023.
European Patent Office (ISA/EP), International Search Report, International Application No. Application No. PCT/US2023/018213, 6 pages, 2023-2079-26.
European Patent Office (ISA/EP), International Search Report, International Application No. PCT/US2023/019458, 7 pages, Aug. 8, 2023.
European Patent Office (ISA/EP), International Search Report, International Application No. PCT/US2023/060943, 7 pages, Jun. 6, 2023.
European Patent Office (ISA/EP), International Search Report, International Application No. PCT/US2021/050948, 6 pages, Mar. 4, 2022.
European Patent Office. International Search Report, International Application No. PCT/US2021/065240, 6 pages, May 23, 2022.
European Patent Office, International Search Report, International Application No. PCT/US2021/071595, 7 pages, Mar. 17, 2022.
European Patent Office, International Search Report, International Application No. PCT/US2022/013208, 7 pages, Apr. 26, 2022.
European Patent Office, International Search Report, International Application No. PCT/US2021/065242, 3 pages, Apr. 4, 2022.
U.S. Patent and Trademark Office, Non-Final Office Action, U.S. Appl. No. 17/448,875, 25 pages, Oct. 6, 2022.
U.S. Patent and Trademark Office, Non-Final Office Action, U.S. Appl. No. 17/448,875, 30 pages, Sep. 29, 2023.
U.S. Patent and Trademark Office, Non-Final Office Action, U.S. Appl. No. 17/580,495, 27 pages, Dec. 11, 2023.
U.S. Patent and Trademark Office, Notice of Allowance, U.S. Appl. No. 17/478,593, 10 pages, Aug. 31, 2022.
U.S. Patent and Trademark Office, Notice of Allowance, U.S. Appl. No. 17/580,495, 6 pages, Jun. 6, 2023.
U.S. Patent and Trademark Office, Notice of Allowance, U.S. Appl. No. 17/580,495, 12 pages, Nov. 30, 2022.
U.S. Patent and Trademark Office, Notice of Allowance, U.S. Appl. No. 18/154,757, 10 pages, Jan. 23, 2024.
U.S. Patent and Trademark Office, Restriction Requirement, U.S. Appl. No. 17/932,999, 6 pages, Oct. 3, 2023.
Bhowmick, S, "Explorations on Body-Gesture Based Object Selection on HMD Based VR Interfaces for Dense and Occluded Dense Virtual Environments," Report: State of the Art Seminar, Department of Design Indian Institute of Technology, Guwahati, 25 pages, Nov. 2018.
Bolt, R.A. et al.,, "Two-Handed Gesture in Multi-Modal Natural Dialog," Uist '92, 5th Annual Symposium on User Interface Software and Technology. Proceedings of the ACM Symposium on User Interface Software and Technology, Monterey, pp. 7-14, Nov. 1992.
Brennan, D., "4 Virtual Reality Desktops for Vive, Rift, and Windows VR Compared," Road to VR, Available online at: https://www.roadtovr.com/virtual-reality-desktop-compared-oculus-rift-htc-vive/, 4 pages, retrieved on Jun. 29, 2023.
Camalich, S., "CSS Buttons with Pseudo-elements," available online at: https://tympanus.net/codrops/2012/01/11/css-buttons-with-pseudo-elements/, 8 pages, retrieved on Jul. 12, 2017.
Chatterjee, I. et al., "Gaze+Gesture: Expressive, Precise and Targeted Free-Space Interactions," ICMI '15, 8 pages, 2015.
Lin, J. et al., "Towards Naturally Grabbing and Moving Objects in VR," IS&T International Symposium on Electronic Imaging and the Engineering Reality of Virtual Reality, 6 pages, 2016.
McGill, M. et al, "Expanding the Bounds of Seated Virtual Workspaces," University of Glasgow, Available online at: https://core.ac.uk/download/pdf/323988271.pdf, 44 pages, [retrieved on Jun. 27, 2023], Jun. 5, 2020.
Pfeuffer, K. et al, "Gaze + Pinch Interaction in Virtual Reality," In Proceedings of SUI '17, Brighton, United Kingdom, pp. 99-108, 2017.
European Patent Office, International Search Report issued Dec. 21, 2021, which pertains to PCT Application No. PCT/US2021/049131, filed Sep. 3, 2021. 4 pgs.
European Patent Office, Written Opinion issued Dec. 21, 2021, which pertains to PCT Application No. PCT/US2021/049131, filed Sep. 3, 2021. 9 pgs.
European Patent Office, European Search Report, European Patent Application No. 24178730.8, 8 pages, Oct. 14, 2024.
U.S. Patent and Trademark Office, Non-Final Office Action, U.S. Appl. No. 18/375,260, 11 pages, Nov. 24, 2023.
European Patent Office, Search Report received for European Patent Application No. 21801378.7, 5 pages, Jul. 10, 2024.
U.S. Patent and Trademark Office, Non-Final Office Action received for U.S. Appl. No. 18/305,201, 11 pages, May 23, 2024.
U.S. Patent and Trademark Office, Notice of Allowance received for U.S. Appl. No. 17/448,875, 8 pages, Jul. 12, 2024.
U.S. Patent and Trademark Office, Notice of Allowance received for U.S. Appl. No. 17/659,147, 13 pages, May 29, 2024.
U.S. Patent and Trademark Office, Notice of Allowance received for U.S. Appl. No. 18/421,675, 8 pages, Jul. 31, 2024.
U.S. Patent and Trademark Office, Notice of Allowance received for U.S. Appl. No. 18/423,187, 9 pages, Jun. 5, 2024.
U.S. Patent and Trademark Office, Notice of Allowance received for U.S. Appl. No. 18/463,739, 9 pages, Jun. 17, 2024.
U.S. Patent and Trademark Office, Notice of Allowance received for U.S. Appl. No. 18/465,098, 8 pages, Jun. 20, 2024.
European Patent Office, European Search Report, European Patent Application No. 24179233.2, 10 pages, Oct. 2, 2024.
U.S. Patent and Trademark Office, Final Office Action, U.S. Appl. No. 18/182,300, 34 pages, Oct. 31, 2024.
European Patent Office, European Search Report, European Patent Application No. 24178752.2, 8 pages, Oct. 4, 2024.
U.S. Patent and Trademark Office, Notice of Allowance, U.S. Appl. No. 18/370,321, 9 pages, Apr. 23, 2025.
U.S. Patent and Trademark Office, Non-Final Office Action, U.S. Appl. No. 18/810,881, 26 pages, May 2, 2025.
U.S. Patent and Trademark Office, Non-Final Office Action, U.S. Appl. No. 18/369,004, 24 pages, Jun. 10, 2025.

* cited by examiner

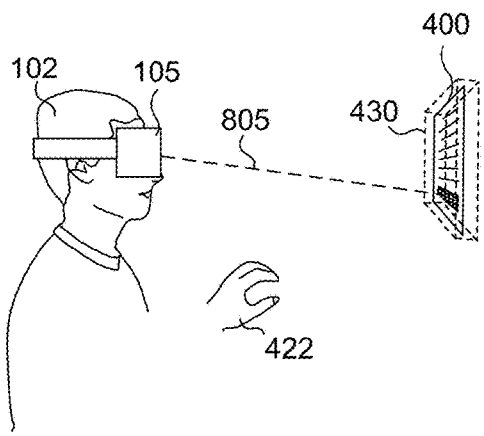
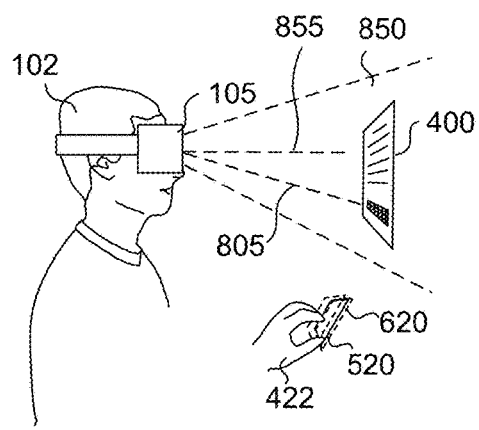
FIG. 8A  FIG. 8B
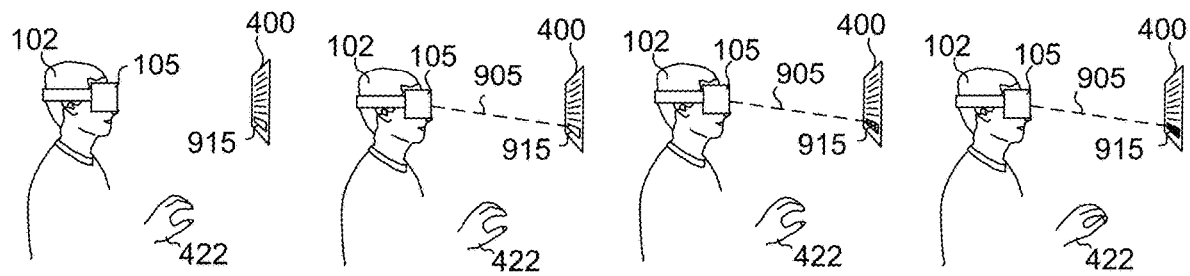
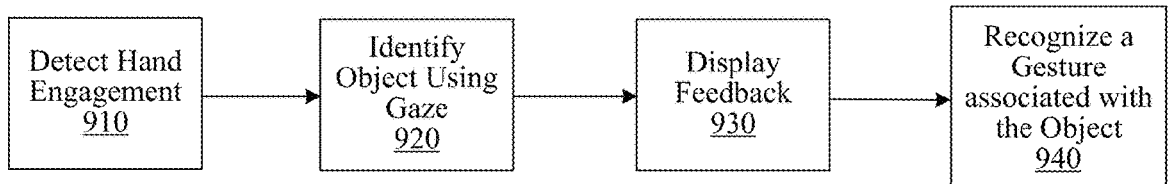
FIG. 9
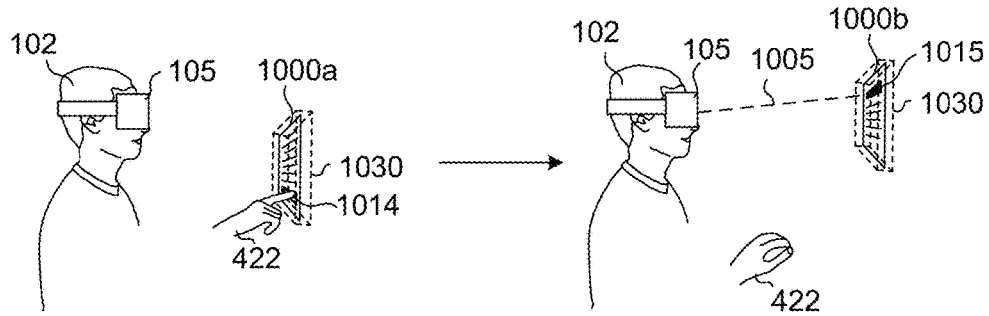
FIG. 10

INPUT RECOGNITION BASED ON DISTINGUISHING DIRECT AND INDIRECT USER INTERACTIONS

CROSS-REFERENCE TO RELATED APPLICATION

This application claims the benefit of U.S. Provisional Application Ser. No. 63/470,565 filed Jun. 2, 2023, and U.S. Provisional Application Ser. No. 63/521,807 filed Jun. 19, 2023, each of which is incorporated by reference herein in its entirety.

TECHNICAL FIELD

The present disclosure generally relates to assessing user interactions with electronic devices that involve hand and body gestures, gaze, voice and/or other user activity.

BACKGROUND

Existing user interaction systems may be improved with respect to facilitating interactions based on user activities.

SUMMARY

Various implementations disclosed herein include devices, systems, and methods that interpret user activity as user interactions with virtual elements (e.g., user interface elements) positioned within in a three-dimensional (3D) space such as an extended reality (XR) environment. Some implementations enable user interactions with virtual elements displayed in 3D environments that utilize alternative input modalities, e.g., XR environments that interpret user activity as either direct interactions or indirect interactions with virtual elements. Whether user activity should be interpreted using one of multiple input modality schemes (e.g., using a direct interpretation process or an indirect interpretation process) may be determined based on sensor data (e.g., images, depth sensor data, motion data of devices held or worn by the user, etc.) and/or using one or more modality distinguishing criteria.

In some implementations, an XR environment may enable a user to provide input using both (a) a direct input modality in which the user interacts with virtual content by virtually touching the virtual content (and/or coming in close proximity to the virtual content as determined via one or more proximity criteria) and (b) an indirect input modality in which the user interacts with virtual content using gaze, pointing gestures, input devices, etc. to interact with the content without necessarily virtually touching or coming close to the virtual content.

In some implementations, for a direct interaction, the virtual element (e.g., a user interface (UI) element) is identified based on the user's hand position intersecting (or coming close to as determined via one or more proximity criteria) a 3D area associated with a virtual element. Based on determining that a direct input modality is applicable, a direct interaction recognition process is applied to interpret the user activity, e.g., determining whether the hand gesture/motion is a tap, a swipe, etc. During such user activity, the hand (or other body part) virtually interacts with a virtual element by virtually contacting the UI element. For example, a user may move their finger to directly tap, pinch, swipe, or otherwise interact with a UI element within a 3D space.

In some implementations, for an indirect interaction, the virtual element that is the subject of a user interaction is identified in another way, e.g., based on the user's gaze direction and associated hand gesture. Based on determining that an indirect input modality is applicable, an indirect interaction recognition process is applied to interpret the user activity (e.g., the gaze direction and an associated hand pinch) as initiating or performing an action with respect to a gaze-identified virtual element. User activity may be indirect, for example, in the sense that the hand need not contact or approach the UI element in the 3D space. For example, hand gestures may be performed by a user's hand while resting by the user's side or otherwise close to the user, while the UI is displayed at a distance in the 3D space relative to a viewpoint of the user (e.g., a position of the user in the 3D space).

In some implementations, a processor performs a method by executing instructions stored on a computer readable medium. The method obtains a position of a virtual object in an XR environment corresponding to a 3D space. The virtual object may be an element of a UI. For example, a user interface may include one or more user interface elements, such as buttons, icons, text entry fields, slider bars, or menu items, that are presented as part of a virtual user interface displayed at a fixed position or otherwise within the XR environment, e.g., a virtual two-dimensional (2D) menu with buttons displayed a few feet in front of the user in XR, relative to the viewpoint of the user.

The method comprises obtaining a user hand position in the 3D space based on sensor data, where the hand position is associated with a hand gesture. In some implementations, a user hand position is tracked using sensor data (e.g., image sensor data, depth sensor data, motion sensor data, etc.) that is used to determine a hand configuration and/or a movement path of the user's hand over a time period. In one example, the user position data may be a skeleton representation of the user generated periodically, e.g., 30 fps, based on outward facing image/depth sensors on a head mounted device (HMD). Such user position data may provide a path of a portion of a skeleton representation of a user (e.g., a finger skeleton portion of a skeletal user representation). In other words, for example, by tracking the orientation of the skeleton over multiple instants in time, a path of a finger portion of the skeleton over time relative to a 3D space may be determined and/or a configuration may be determined. A configuration may be defined by or determined based on relative spatial positioning and/or orientations of portions of the hand (e.g., fingers, palm, etc.) relative to one another, which may define a gesture such as a pinching of a thumb and pointer finger together.

The method comprises determining an interaction mode based on the user hand position and the position of the virtual object in the 3D space. Determining the interaction mode may involve selecting whether the interaction mode is direct or indirect based on the user hand position and the position of the virtual object in the 3D space. For example, a direct interaction mode may be selected based on the hand position intersecting a 3D area associated with the virtual object in the 3D space, e.g., a bounding box or other volume defined around the virtual object or using a threshold distance relative to the position of the virtual object. Conversely, an indirect interaction mode may be selected based on the hand position not intersecting such a 3D area. Other criteria may additionally or alternatively be applied. For example, whether the interaction mode is direct or indirect may be based upon determining an attention zone based on a gaze direction or head pose of the user, determining an intersection of the hand position with a 3D area associated with the virtual object in the 3D space, and/or determining that the intersection is within or outside of that attention zone. Whether the interaction mode is direct or indirect may be based on a determination that an intersection of the hand position and a 3D area associated with the virtual object in the 3D space is within or outside of an attention zone indicated by gaze direction or head pose of the user.

The method comprises interpreting the hand gesture using an interaction recognition process associated with the determined interaction mode, e.g., using an indirect interaction recognition process based on determining an indirect interaction mode or using a direct interaction recognition process based on determining a direct interaction mode.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 8A-8B illustrate an exemplary determination of an indirect interaction mode, in accordance with some implementations.

FIG. 9 illustrates indirect interaction recognition, in accordance with some implementations.

FIG. 10 illustrates a transition from a direct interaction mode to an indirect interaction mode, in accordance with some implementations.

Figure 1A:
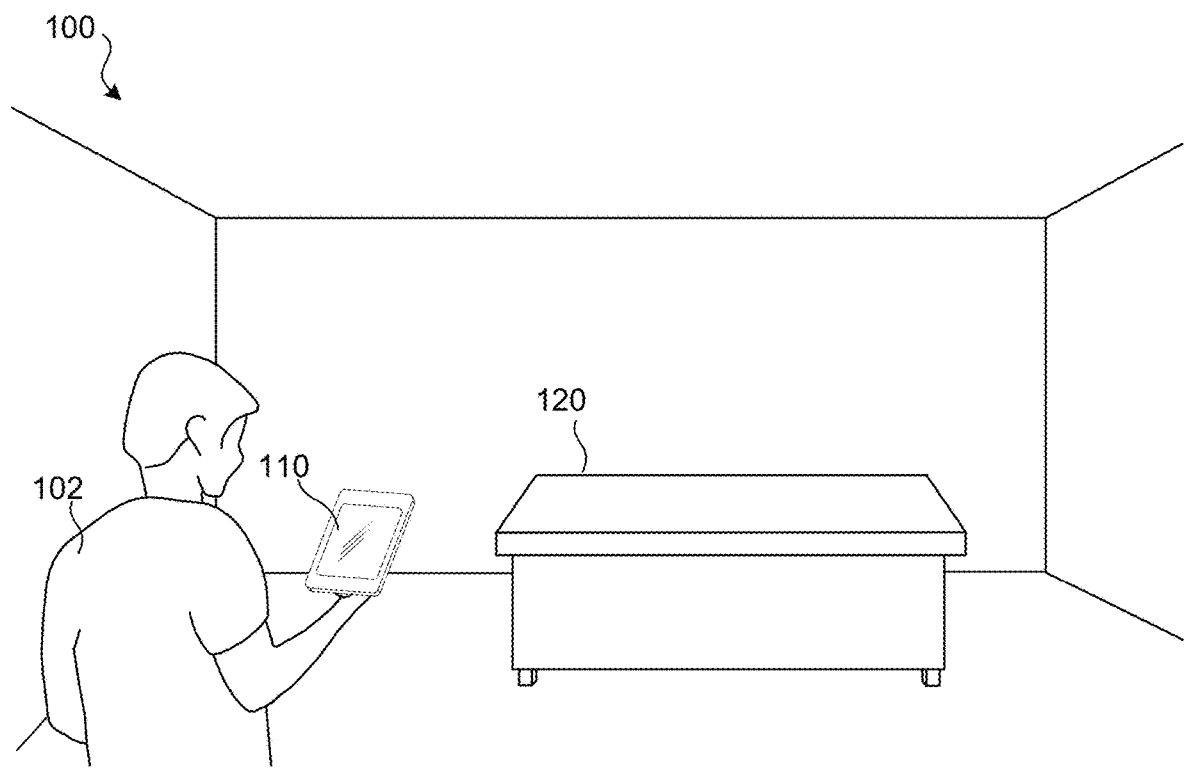
FIGS. 1A-B illustrate exemplary electronic devices operating in a physical environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
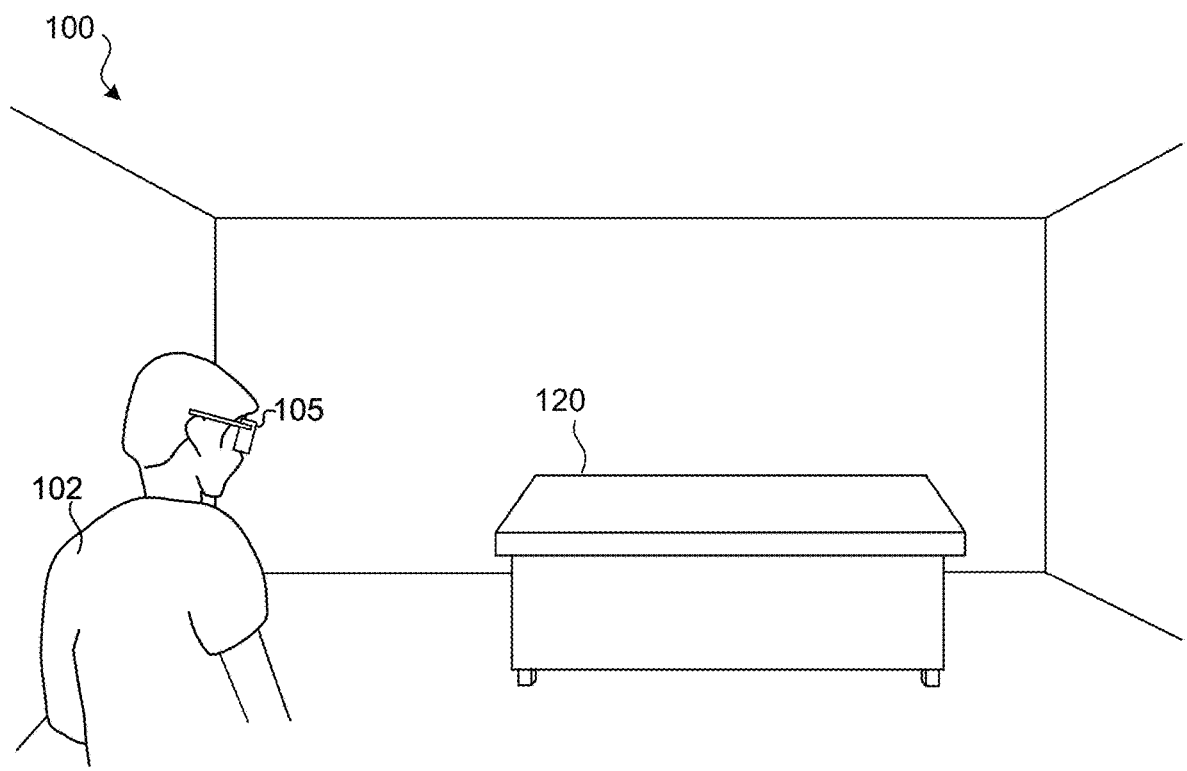

FIGS. 1A-B illustrate exemplary electronic devices 105 and 110 operating in a physical environment 100. In the example of FIGS. 1A-B, the physical environment 100 is a room that includes a desk 120. The electronic devices 105 and 110 may include one or more cameras, microphones, depth sensors, or other sensors that can be used to capture information (e.g., images, sound, lighting characteristics, etc.) about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 (e.g., including locations of objects, such as the desk 120, in the physical environment 100) and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that are generated based on camera images and/or depth camera images of the physical environment 100, as well as a representation of user 102 based on camera images and/or depth camera images of the user 102. Such an XR environment may include virtual content that is positioned at 3D locations relative to a 3D coordinate system (i.e., a 3D space) associated with the XR environment, which may correspond to a 3D coordinate system of the physical environment 100.

In some implementations, video (e.g., pass-through video depicting a physical environment) is received from an image sensor of a device (e.g., device 105 or device 110). In some implementations, a 3D representation of a virtual environment is aligned with a 3D coordinate system of the physical environment. A sizing of the 3D representation of the virtual environment may be generated based on, for example, a scale of the physical environment or a positioning of an open space, floor, wall, etc., such that the 3D representation is configured to align with corresponding features of the physical environment. In some implementations, a viewpoint (e.g., of the user 102) within the 3D coordinate system may be determined based on a position of the electronic device within the physical environment. The viewpoint may be determined based on, for example, image data, depth sensor data, motion sensor data, etc., which may be retrieved via a virtual inertial odometry system (VIO), a simultaneous localization and mapping (SLAM) system, etc.

Figure 2:
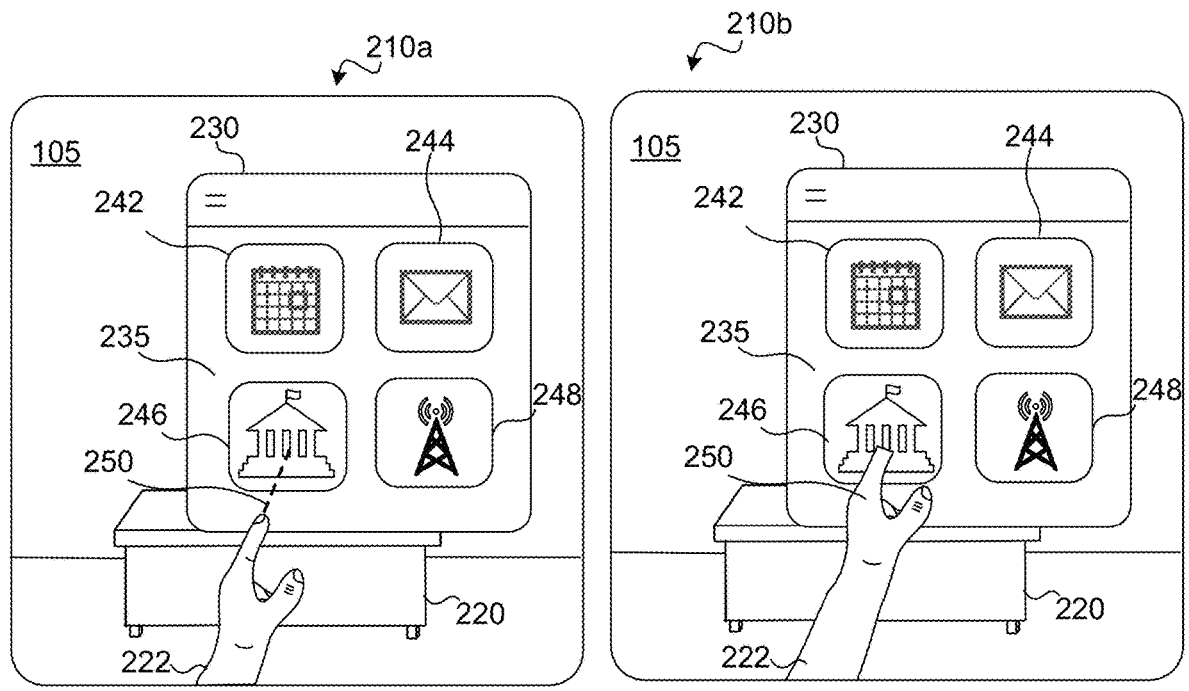
FIG. 2 illustrates views, provided via a device, of virtual elements within the 3D physical environment of FIGS. 1A-1B in which the user performs a direct interaction, in accordance with some implementations.

FIG. 2 illustrates views, provided via a device, of virtual elements within the 3D physical environment of FIGS. 1A-1B in which the user performs a direct interaction. In this example, the user 102 makes a hand gesture relative to content presented in views 210a-b of an XR environment provided by a device (e.g., device 105 or device 110 above). The views 210a-b of the XR environment include an exemplary user interface 230 of an application (e.g., an example of virtual content) and a depiction 220 of the desk 120 (i.e., an example of real content). As an example, in FIG. 2, the user interface 230 is a two-dimensional virtual object (e.g., having a flat front-facing surface). Providing such a view may involve determining 3D attributes of the physical environment 100 above (e.g., a position of the desk 120 in the physical environment 100, a size of the desk 120, a size of the physical environment 100, etc.) and positioning the virtual content, e.g., user interface 230, in a 3D coordinate system corresponding to that physical environment 100.

In the example of FIG. 2, the user interface 230 includes various content items, including a background portion 235 and icons 242, 244, 246, 248. The icons 242, 244, 246, 248 may be displayed on the flat user interface 230. The user interface 230 may be a user interface of an application, as illustrated in this example. The user interface 230 is simplified for purposes of illustration and user interfaces in practice may include any degree of complexity, any number of content items, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

In this example, the background portion 235 of the user interface 230 is flat. In this example, the background portion 235 includes all aspects (e.g., visual characteristics) of the user interface 230 being displayed except for the icons 242, 244, 246, 248. Displaying a background portion of a user interface of an operating system or application as a flat surface may provide various advantages. For example, doing so may provide an easy to understand or otherwise use portion of an XR environment for accessing the user interface of the application. In some implementations, multiple user interfaces (e.g., corresponding to multiple, different applications) are presented sequentially and/or simultaneously within an XR environment using one or more flat background portions, though other configurations are possible.

In some implementations, the positions and/or orientations of such one or more user interfaces may be determined to facilitate visibility and/or use. The one or more user interfaces may be at fixed positions and orientations within the 3D environment. In such cases, user movements would not affect the position or orientation of the user interfaces within the 3D environment (e.g., such that the user interfaces remain at their respective positions or orientations and do not move relative to the viewpoint of the user).

The position of the user interface within the 3D environment may be based on determining a distance of the user interface from the user (e.g., from an initial or current user position). The position and/or distance from the user may be determined based on various criteria including, but not limited to, criteria that accounts for application type, application functionality, content type, content/text size, environment type, environment size, environment complexity, environment lighting, presence of others in the environment, use of the application or content by multiple users, user preferences, user input, and other factors.

In some implementations, the one or more user interfaces may be body-locked content, e.g., having a distance and orientation offset relative to a portion of the user's body (e.g., their torso). For example, the body-locked content of a user interface could be 0.5 meters away and 45 degrees to the left of the user's torso's forward-facing vector. If the user's head turns while the torso remains static, a body-locked user interface would appear to remain stationary in the 3D environment at 0.5 m away and 45 degrees to the left of the torso's front facing vector. However, if the user does rotate their torso (e.g., by spinning around in their chair), the body-locked user interface would follow the torso rotation and be repositioned within the 3D environment such that it is still 0.5 meters away and 45 degrees to the left of their torso's new forward-facing vector.

In other implementations, user interface content is defined at a specific distance from the user with the orientation relative to the user remaining static (e.g., if initially displayed in a cardinal direction, it will remain in that cardinal direction regardless of any head or body movement). In this example, the orientation of the body-locked content would not be referenced to any part of the user's body. In this different implementation, the body-locked user interface would not reposition itself in accordance with the torso rotation. For example, a body-locked user interface may be defined to be 2 m away and, based on the direction the user is currently facing, may be initially displayed north of the user. If the user rotates their torso 180 degrees to face south, the body-locked user interface would remain 2 m away to the north of the user, which is now directly behind the user.

A body-locked user interface could also be configured to always remain gravity or horizon aligned, such that head and/or body changes in the roll orientation would not cause the body-locked user interface to move within the 3D environment. Translational movement, on the other hand, would cause the body-locked content to be repositioned within the 3D environment in order to maintain the distance offset.

In the example of FIG. 2, the user 102 moves their hand from an initial position as illustrated by the position of the depiction 222 of the hand in view 210a. The hand moves along path 250 to a later position as illustrated by the position of the depiction 222 in the view 210b. As the user 102 moves their hand along this path 250, the finger intersects the user interface 230. Specifically, as the finger moves along the path 250, it virtually pierces the icon 246 in the user interface 230 and thus a tip portion of the finger (not shown) is optionally occluded in view 210b by the user interface 230 from the viewpoint of the user.

Implementations disclosed herein interpret user movements such as the user 102 of FIGS. 1A-1B moving their hand/finger along path 250 relative to a user interface element such as icon 246 in the user interface 230, to recognize user input/interactions. The interpretation of user movements and other user activity may be based on recognizing user intention using multiple, potentially separate, recognition processes corresponding to different input modalities. Using multiple, potentially separate, recognition processes for different modalities may improve functionality, accuracy, efficiency, and/or provide other device-based or interaction-based benefits.

Recognizing input in the example of FIG. 2 may involve determining that a gesture is a direct interaction and then using a direct input recognition process to recognize the gesture. For example, such a gesture may be interpreted as a tap input directed to the icon 246. In making such a gesture, the user's actual motion relative to the icon 246 may deviate from an ideal motion (e.g., a straight path through the center of the user interface element (e.g., the icon 246) in a direction that is perfectly orthogonal to the plane of the user interface element). The actual path may be curved, jagged, or otherwise non-linear and may be at an angle rather than being orthogonal to the plane of the user interface element. The path may have attributes that make the gesture similar to other types of input gestures (e.g., swipes, drags, flicks, etc.) For example, the non-orthogonal motion may make the gesture similar to a swipe motion in which a user provides input by piercing a user interface element and then moving in a direction along the plane (e.g., horizontally or vertically) of the user interface.

Some implementations disclosed herein determine that a direct interaction mode is applicable and, based on the direct interaction mode, utilize a direct interaction recognition process to distinguish or otherwise interpret user activity that corresponds to direct input, e.g., identifying intended user interactions, for example, based on if, and how, a gesture path intersects one or more 3D regions of space. Such recognition processes may account for actual human tendencies associated with direct interactions (e.g., natural arcing that occurs during actions intended to be straight, tendency to make movements based on a shoulder or other pivot position (e.g., elbow), etc.), human perception issues (e.g., user's not seeing or knowing precisely where virtual content is located relative to their hand), and/or other direct interaction-specific issues.

Note that the user's movement in the real world (e.g., physical environment 100) correspond to movements within a 3D space, e.g., an XR environment that is based on the real-world and that includes virtual content such as user interface positioned relative to real-world objects including the user. Thus, the user is moving his hand in the physical environment 100, e.g., through empty space, but that hand (i.e., a depiction or representation of the hand) intersects with and/or pierces through the user interface 230 of the XR environment that is based on that physical environment. In this way, the user virtually interacts directly with the virtual content.

Figure 3:
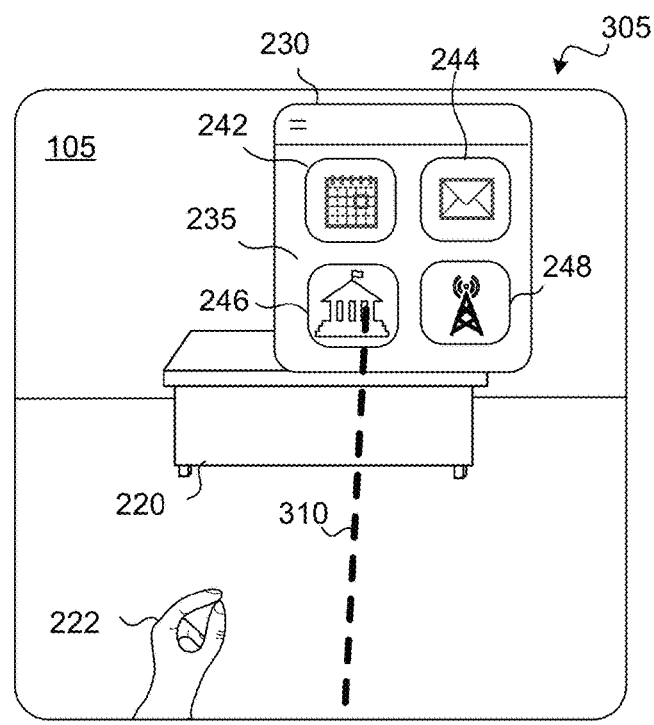
FIG. 3 illustrates views, provided via a device, of virtual elements within the 3D physical environment of FIGS. 1A-1B in which the user performs an indirect interaction, in accordance with some implementations.

FIG. 3 illustrates an exemplary view, provided via a device, of virtual elements within the 3D physical environment of FIGS. 1A-1B in which the user performs an indirect interaction. In this example, the user 102 makes a hand gesture while looking at (e.g., while the gaze of the user 102 is directed toward) content presented in the view 305 of an XR environment provided by a device (e.g., device 105 or device 110). The view 305 of the XR environment includes the exemplary user interface 230 of FIG. 2. In the example of FIG. 3, the user 102 makes a pinching gesture with their hand as illustrated by the depiction 222 while gazing along gaze direction path 310 at user interface icon 246. In this example, this user activity (e.g., a pinching hand gesture along with a gaze directed at a UI element) corresponds to a user intention to interact with user interface icon 246.

Implementations disclosed herein interpret user activity, such as the user 102 forming a pinching hand gesture along with a gaze directed at a UI element, to recognize user/interactions. For example, such user activity may be interpreted as a tap input directed to the icon 246, e.g., selecting icon 246 in the user interface 230, which causes the device to activate the icon 246 and optionally display content (e.g., a user interface) corresponding to the icon 246. However, in performing such actions, the user's gaze direction and/or the timing between a gesture and detection of the gaze at a target with which the user intends the gesture to be associated may be less than perfectly executed and/or timed.

Some implementations disclosed herein determine that an indirect interaction mode is applicable. Based on the indirect interaction mode, an indirect interaction recognition process is used to identify intended user interactions based on user activity. For example, the process may identify intended user interactions based on if, and how, a gesture path (e.g., similar to path 310 in FIG. 3) intersects one or more 3D regions of space. Such recognition processes may account for actual human tendencies associated with indirect interactions (e.g., eye saccades, eye fixations, and other natural human gaze behavior, arching hand motion, retractions not corresponding to insertion directions as intended, etc.), human perception issues (e.g., user's not seeing or knowing precisely where virtual content is relative to their hand), and/or other indirect interaction-specific issues.

Some implementations determine an interaction mode, e.g., a direct interaction mode or indirect interaction mode, so that user behavior can be interpreted by a specialized (or otherwise separate) recognition process for the appropriate interaction type, e.g., using a direct interaction recognition process for direct interactions and an indirect interaction recognition process or indirect interactions. Such specialized (or otherwise separate) process utilization may be more efficient, more accurate, or provide other benefits relative to using a single recognition process configured to recognize multiple types (e.g., both direct and indirect) interactions.

Figure 4:
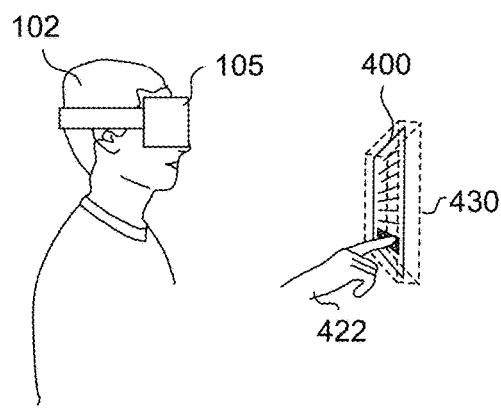
FIG. 4 illustrates an exemplary determination of a direct interaction mode based on a 3D area around a virtual object, in accordance with some implementations.

FIG. 4 illustrates an exemplary determination of a direct interaction mode based on a 3D area 430 around a user interface 400. In this example, the user 102 is using device 105 (e.g., implemented as an HMD) to view and interact with an XR environment that includes the user interface 400. A 3D area 430 around the user interface 400 is determined by the device 105. Note that, in this example, the dashed lines indicating the boundaries of the 3D area 430 are for illustration purposes and are not visible to the user 102. The 3D area 430 is used in determining at different points in time, whether a direct interaction mode or indirect interaction mode is applicable based on user activity. In this example, the interaction mode is determined based on whether hand 422 of user 102 intersects with the 3D area 430. In this case, in FIG. 5, hand 422 does intersect with 3D area 430 (e.g., breaches a boundary of the 3D area 430) and, thus, the interaction mode is determined to be a direct interaction mode. The user's activity (e.g., hand movement, etc.) is assessed accordingly, e.g., using a direct interaction recognition process, such as providing a selection directed to the user interface 400.

Figure 5:
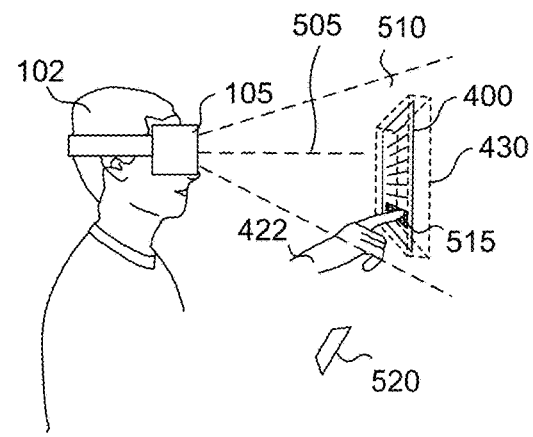
FIG. 5 illustrates an exemplary determination of a direct interaction mode based on a 3D area around a virtual object and an attention zone, in accordance with some implementations.

FIG. 5 illustrates an exemplary determination of a direct interaction mode based on a 3D area 430 around a user interface 400 and an attention zone 510. In this example, the user 102 is using device 105 (e.g., implemented as an HMD) to view and interact with an XR environment that includes the user interface 400. A 3D area 430 around the user interface 400 is determined by the device 105, as similarly discussed above with reference to FIG. 4. Note that, in this example, the dashed lines indicating the boundaries of the 3D area 430 are for illustration purposes and are not visible to the user 102. The attention zone 510 is also a 3D area (e.g., a conical-shaped zone centered around a center line corresponding to the user's head direction or a forward-facing direction of the device 105). User head direction may be determined based on estimating a pose (e.g., position and/or orientation of the head using sensor(s) on the device 105). For example, the head direction may be determined based on determining a position of a plane corresponding to the user's cheeks and extending a vector from a position on the user's face in a direction orthogonal to that plane. In another example, head direction may be determined in part on an orientation of HMD worn on the head, e.g., determined a vector referenced to the device directly rather than based on the user's face based on device pose tracking techniques. User device direction may be determined via sensor data, e.g., image data, depth data, motion data, VIO processes, SLAM processes, etc. A attention zone 510 may be determined based on a field of view provided in views provided by the device 105, e.g., corresponding to a center portion (e.g., the center 30%, 50%, 70%, etc.) of the field of view, such that the attention zone 510 has predetermined three-dimensional characteristics (e.g., a fixed volume relative to the center line discussed above). In other implementations, the attention zone 510 corresponds to the field of view provided in the views provided by the device 105.

The 3D area 430 and attention zone 510 are used in determining, at different points in time, whether a direct interaction mode or indirect interaction mode is applicable for a detected user activity. In this example, the interaction mode is determined based on determining that the hand 422 of user 102 intersects with the 3D area 430 at an intersection point 515 and also whether the intersection point 515 is within the attention zone. In this case, the intersection point 515 is also within the attention zone 510 and, thus, the interaction mode is determined to be a direct interaction mode. The user's activity (e.g., hand movement, etc.) is assessed accordingly, e.g., using a direct interaction recognition process, as previously discussed herein. The interaction mode may or may not also apply with respect to potential interactions with other (e.g., nearby) user interface elements, such as second user interface 520. For example, in FIG. 5, because the hand 422 intersects the 3D area 430 (e.g., at the intersection point 515) around the user interface 400, rather than a 3D area around the second user interface 520, the device 105 does not perform a selection operation directed to the second user interface 520 based on the user's activity (e.g., movement of the hand 422) when the device 105 performs a selection operation directed to the user interface 400.

Figure 6:
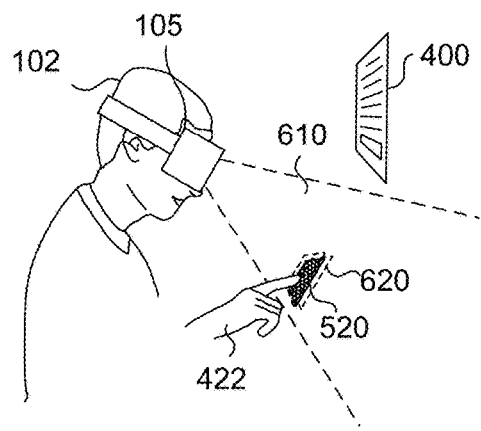
FIG. 6 illustrates another exemplary determination of a direct interaction mode based on a 3D area around a virtual object and an attention zone, in accordance with some implementations.

FIG. 6 illustrates another exemplary determination of a direct interaction mode based on a 3D area 620 around a virtual object (e.g., the second user interface 520) and an attention zone 610. In this example, the user 102 is using device 105 to view and interact with an XR environment that includes the user interface 400 of FIG. 5 and a second user interface 520. A 3D area 620 around the virtual object (e.g., the second user interface 520) is determined by the device 105. Note that, in this example, the dashed lines indicating the boundaries of the 3D area 620 are for illustration purposes and are not visible to the user 102. In some implementations, the 3D area 620 has one or more characteristics of the 3D area 520 discussed above. The attention zone 610 is also a 3D area (e.g., a conical-shaped zone centered around a center line corresponding to the user's head direction or a forward-facing direction of the device 105). In some implementations, the attention zone 610 has one or more characteristics of the attention zone 510 discussed above. The 3D area 620 and attention zone 610 are used in determining, at different points in time, whether a direct interaction mode or indirect interaction mode is applicable for a detected user activity. In this example, the interaction mode is specific to interactions with the second user interface 520 (and thus is determined to not apply to user interface 400).

The interaction mode for the second user interface 520 is determined based on determining that the hand 422 of user 102 intersects with the 3D area 620 at an intersection point (e.g., similar to intersection point 515 in FIG. 5) and whether the intersection point is within the attention zone. In this case, in FIG. 6, the intersection point is within the attention zone 610 and, thus, the interaction mode is determined to be a direct interaction mode. The user's activity (e.g., hand movement, etc.) is assessed accordingly, e.g., using a direct interaction recognition process, as similarly described above.

In should be noted an intersection point may correspond to a single location, e.g., x,y,z position, to a 2D, or to a 3D area at which an intersection occurs. Whether an intersection point is considered within an attention zone may be based on whether there is any intersection, e.g., any point on hand 422 intersects any point in the attention zone 610. In another example, whether an intersection point is considered within an attention zone is based on other criteria, e.g., whether at least portion of a given size of the hand 422 is within the attention zone 610. In another example, a particular point on a hand is used (e.g., a point on or near the end of a particular finger) to determine whether an intersection point is considered within an attention zone, e.g., when that particular point on the hand 422 is within the attention zone 610.

Figure 7:
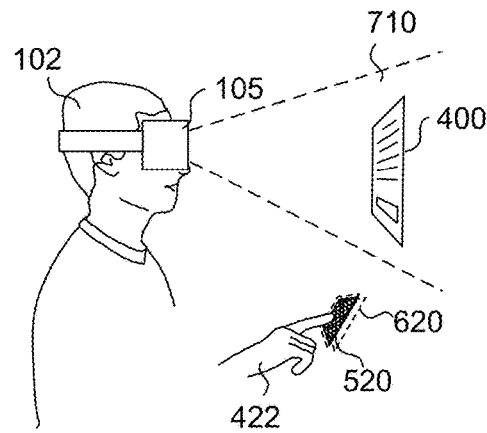
FIG. 7 illustrates an exemplary determination of a direct interaction mode based on a time threshold, in accordance with some implementations.

FIG. 7 illustrates an exemplary determination of a direct interaction mode based on a time threshold. In this example, the direct interaction mode has been established based on the determination made in FIG. 6 above. This direct interaction mode with the second user interface 520 is determined to remain active for a period of time (e.g., 0.1, 1, 5, 10, 15, 30, etc. seconds) after the determination is made. Thus, even if the user looks up (changing the attention zone 710) to encompass the user interface 400 rather than the second user interface 520, as shown in FIG. 7, the direct interaction mode determined for the second user interface 520 remains active. In other words, within the threshold amount of time, the direct interaction mode is still applicable to interactions of hand 422 with the second user interface 520 (e.g., selection interactions, movement interactions, etc.). Once the threshold amount of time above expires, the interaction mode may again be determined, e.g., as being direct or indirect and/or with respect to the same or different user interface elements. In some implementations additional or alternative heuristics (e.g., other than a time-based threshold) are used to determine when to redetermine the interaction mode, e.g., based on a change of content, change of environment, movement of the user that has certain characteristics.

FIG. 8A illustrates an exemplary determination of an indirect interaction mode based on a 3D area around a virtual object. In this example, the user 102 is using device 105 to view and interact with an XR environment that includes the user interface 400 of FIGS. 4-7. A 3D area 430 around the user interface 400 is determined by the device 105, as previously discussed herein. Note that, in this example, the dashed lines indicating the boundaries of the 3D area 430 are for illustration purposes and are not visible to the user 102. The 3D area 430 is used in determining at different points in time whether a direct interaction mode or indirect interaction mode is applicable for a detected user activity. In this example, as shown in FIG. 8A, the interaction mode is determined based on whether hand 422 of user 102 intersects with the 3D area 430. In this case, hand 422 does not intersect with 3D area 430 and, thus, the interaction mode is determined to be an indirect interaction mode. The user's activity (e.g., hand movement along with gaze direction 805, etc.) is assessed accordingly, e.g., using an indirect interaction recognition process, such as providing a selection directed to the user interface 400 as similarly described herein.

In some implementations, a third interaction mode (e.g., a no interactions allowed mode) may be determined based on one or more criteria being satisfied. For example, such a mode may be triggered by a user providing input to specifically enter a mode in which the user's activity will not disturb (e.g., by providing relative interactions with) content. In another example, such a mode may be triggered manually or automatically for a low power mode.

FIG. 8B illustrates an exemplary determination of an indirect interaction mode based on a 3D area 620 around a virtual object (i.e., second user interface 520) and an attention zone 850. In this example, the user 102 is using device 105 to view and interact with an XR environment that includes the user interface 400 and a second user interface 520. A 3D area 620 around the second user interface 520 is determined by the device 105, as similarly described above. Note that, in this example, the dashed lines indicating the boundaries of the 3D area 620 are for illustration purposes and are not visible to the user 102. The attention zone 850 is also a 3D area (e.g., a conical-shaped zone centered around a center line 855 corresponding to the user's head direction or a forward-facing direction of the device 105), as similarly described above.

The 3D area 620 and attention zone 850 are used in determining, at different points in time, whether a direct interaction mode or indirect interaction mode is applicable. In this example, the interaction mode is determined based on determining that the hand 422 of user 102 intersects with the 3D area 620 at an intersection point and whether the intersection point is also within the attention zone 850. In this case, the hand 422 of user 102 does intersect with the 3D area 620, however the intersection point is not within the attention zone 850 and, thus, the interaction mode is determined to be an indirect interaction mode. The user's activity (e.g., hand movement and gaze direction 805, etc.) is assessed accordingly, e.g., using an indirect interaction recognition process, as similarly described above. The interaction mode may or may not also apply with respect to potential interactions with nearby user interface elements, such as the user interface 400, as similarly described above.

FIG. 9 illustrates indirect interaction recognition. In this example, sensor data on device 105 is used to recognize a user interaction made by user 102, e.g., based on outward-facing image sensor data, depth sensor data, eye sensor data, motion sensor data, etc. Such data may be monitored for an engagement condition corresponding to the start of a user interaction. In some implementations, engagement is triggered based on detecting hand motion, e.g., raising a hand or raising a hand while making a particular hand gesture.

In this example, at block 910, the process includes detecting that the user 102 has positioned their hand 422 within view of outward facing image sensors (e.g., in the field of view of the XR environment of FIG. 9). The process may include detecting a particular hand configuration, e.g., a claw shape, a flat hand, a steady hand in any configuration, etc., as an indication of hand engagement or may simply include detecting the presence of the hand 422 within sensor view.

At block 920, the process includes identifying an object using user gaze data. In this example, the process includes identifying that the gaze direction 905 of user 102 is on user interface element 915 of the user interface 400, as shown in FIG. 9.

At block 930, the process includes displaying feedback based on the object identified by the gaze. In this example, the feedback distinguishes user interface element 915 graphically (e.g., from other user interface elements displayed in the user interface 400) to indicate that the user interface element 915 now has a different state (e.g., a "hover" state that is analogous to the state of a traditional UI icon when a cursor is on the item without clicking/tapping). In some implementations, displaying the user interface element 915 with feedback includes highlighting or bolding the user interface element 915, displaying the user interface element 915 with a focus ring or glow, increasing a size of the user interface element 915, and/or changing a color of the user interface element 915.

At block 940, the process includes recognizing a gesture to be associated with the identified object. In this example, the user is gazing in gaze direction 905 at user interface element 915 while (or at least within a threshold time with respect to) the device 105 detects a pinch gesture by hand 422. This pinch gesture, in this example, is interpreted to initiate an action upon the user interface element 915, e.g., causing a selection action that is analogous to a cursor "click" event of a traditional UI icon during which a cursor is positioned on an icon and a trigger such as a mouse click or track pad tap is received or similarly analogous to a touch screen "tap" event.

FIG. 9 illustrates examples of recognizing indirect user interactions.

Numerous other types of indirect interactions can be recognized, e.g., based on one or more user actions identifying a user interface element and/or one or more user actions providing input (e.g., no-action/hover type input, selection type input, input having a direction, path, speed, acceleration, etc.). Input in 3D space that is analogous to input on 2D interfaces may be recognized, such as input analogous to mouse movements, mouse button clicks, touch screen touch events, trackpad events, joystick events, game controller events, etc.

FIG. 10 illustrates a transition from a direct interaction mode to an indirect interaction mode. In this example, at a first point in time, a direct interaction mode is determined based on a user hand 422 being within the 3D area 1030 around a user interface 1000a, as similarly discussed herein. In this example, the interaction mode is determined based on whether hand 422 of user 102 intersects with the 3D area 1030. In this case, hand 422 does intersect with 3D area 1030 and, thus, the interaction mode is determined to be a direct interaction mode. The user's activity (e.g., hand movement, etc.) is assessed accordingly, e.g., using a direct interaction recognition process, as previously discussed above. A direct interaction recognition process may include recognizing a direct touch interaction with UI element 1014. This direct touch may initiate an action corresponding to the UI element 1014, e.g., triggering the display of user interface 1000b.

Then, at a second point in time, the direct interaction mode is exited based on user hand 422 being outside of the 3D area 1030 around a user interface 1000b.

At the second point in time, an indirect interaction mode may be determined based on user hand 422 being outside of the 3D area 1030 around a user interface 1000b. In this example, the interaction mode is determined based on whether hand 422 of user 102 intersects with the 3D area 1030, as previously discussed herein. In this case, hand 422 does not intersect with 3D area 1030 and, thus, the interaction mode is determined to be an indirect interaction mode. The user's activity (e.g., hand movement, gaze direction, etc.) is assessed accordingly, e.g., using an indirect interaction recognition process. A direct interaction recognition process may include recognizing a gaze-pinch interaction with UI element 1015, e.g., recognizing that a pinch of hand 422 occurs while a gaze direction 1005 is directed at UI element 1015. This interaction may initiate an action corresponding to the UI element 1015, e.g., triggering a change in the user interface 1000b, such as a change in appearance of the user interface 1000b or one or more elements displayed in the user interface 1000b).

During a user experience, a user's interaction mode may transition from direct to indirect and vice versa, providing the user with significant flexibility with respect to interacting with UI content in a manner that best suits the user and/or circumstances, as a benefit. The transition may be accompanied by feedback indicating to the user that a transition of interaction modes has occurred and/or identifying the new/active mode.

Exemplary Direct and Indirect Interaction Recognition

In some circumstances, a user interface (or portion of a user interface) may be presented at a location that is proximate the current location of a user's hand. For example, a user may have their hands resting on a lap or desk surface while interacting with a user interface a meter in front and the user interface may initiate the display of another user interface element such as a panel, keyboard, color picker, or other element proximate to the hand location. Doing so may provide an intuitive, easy, efficient, etc. environment for the user to use additional user interface elements, e.g., by direct touch interactions. However, at a given time when such a UI element is displayed, the user may instead intend an indirect interaction (e.g., based on gaze direction and a trigger activity such as a pinch) with the main user interface window displayed in front of them and may, for example, inadvertently perform a pinch (or other indirect trigger gesture) on the UI element that was displayed proximate the user's hand. Some implementations provide rules, logic, or strategies to interpret user activity in these and other circumstances in accordance with the user's intentions.

Figure 11A:
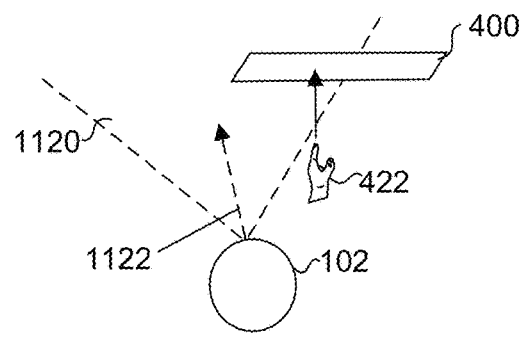
FIGS. 11A-E illustrate responding to direct and indirect interactions, in accordance with some implementations.

FIG. 11A illustrates a direct interaction target selection identification process. In this example, an attention zone 1120 is generated and used to accurately respond to a user tap interaction performed by the user 102 pushing hand 422 to virtually touch the user interface 400. In this example, the attention zone 1120 is a cone formed around ray 1122 (e.g., a cone having a 40° conical half angle). The ray 1122 may be based on determine a direction of user intention based on user gaze direction and/or head pose direction (e.g., using an average between gaze direction and head pose direction). In some implementations, using a relatively wide attention zone (e.g., 30+° conical half angle or other angle determined to correspond to where peripheral vision begins) may provide various benefits. Such a wide attention zone may help ensure that intentional direct touch interactions that may be wide of the user's attention direction (e.g., the user reaching relatively far left, far right, far up, and/or far down to begin a direct touch scroll interaction) are recognized and treated as direct touch interactions. The attention zone 1120 may be used within target discovery. A parameter, e.g., conical half angle) may be used to adjust the width of the cone for different circumstances and/or use cases. If an interaction position/pose (e.g., were the hand 422 is determined to intersect the user interface 400) is within the attention zone 1120 (as illustrated in FIG. 11A) or the target was recently in the attention zone 1120, the system may enable a direct interaction (e.g., a direct hover, touch, pinch, etc.). A pinch in direct hover range may automatically be determined to be a direct pinch.

Figure 11B:
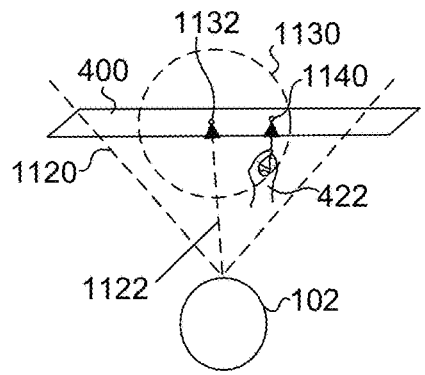
Figure 11C:
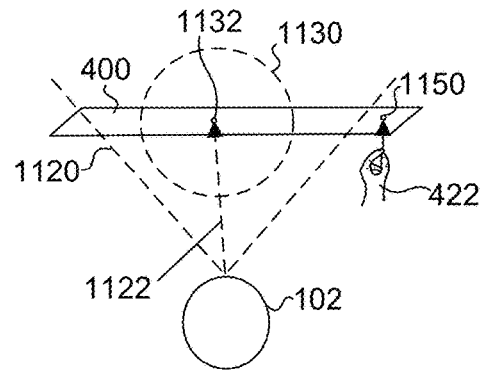

FIGS. 11B-C illustrate distinguishing between direct and indirect trigger interactions (e.g., pinches). In this example, an attention zone 1120 and/or check zone 1130 are generated and used to accurately respond to a trigger (e.g., pinch) interaction performed by the user 102 using hand 422 (e.g., when the user pinches hand 422 on the user interface 400). In this example, the attention zone 1120 is a cone formed around ray 1122 (e.g., a cone having a 40° conical half angle). In this example, the check zone 1130 is sphere centered around a position 1132 at which the user's gaze ray intersects the user interface 400. The sphere may have a size determined based on various criteria, e.g., a sphere of 35 cm diameter (e.g., an approximately 1.0 foot diameter sphere) may ensure that the sphere would include a keyboard displayed within the user interface 400. To interpret the user action (i.e., pinching hand 422 at hit location 1140 on user interface 400), the system determines whether that hit location 1140 lies within the check zone 1130. If hit location 1140 lies within the check zone 1130, the pinch of hand 422 is determined to be a direct interaction, i.e., a pinch at location 1140, rather than an indirect interaction, i.e., a pinch associated with the position 1132 at which the user's gaze ray intersects the user interface 400. In contrast, if the hit location 1150 associated with the pinch lies outside of the check zone 1130 (as illustrated in FIG. 11C), the pinch of hand 422 is determined to be an indirect interaction, i.e., the pinch will be associated with the position 1132 at which the user's gaze ray intersects the user interface 400, rather than a direct interaction, i.e., a pinch at location 1150.

The attention zone 1120 and/or check zone 1130 may additionally or alternatively be used to provide appropriate hover feedback/state determinations. As the user's hand approaches a user interface, if the hand 422 is within check zone 1130 proximity/finger-based direct hover feedback may be shown (e.g., highlighting the position on the UI nearest the user's hand). However, if the hand 422 is not within the check zone 1130, such direct hover feedback may be withheld, i.e., not shown. The system may apply criteria to ensure that both direct hover and indirect hover feedback are not shown when a user is both gazing at and directly interacting with a UI element such as a keyboard. The system may also such criteria to handle circumstances in which a UI element is close to the user (e.g., a keyboard near the user's resting hand position) and a main user interface is at a further distance. If the user is gazing at the close UI element, direct interactions via hand gestures with that close UI element will be enabled, whereas, if the user is gazing at the main UI, hand gestures (outside of the check zone 1130), even if located at the close UI element, will be treated as indirect interactions with locations on the main UI at which the user is gazing.

In some implementations, interpreting a pinch as a direct pinch or an indirect pinch is based on whether the pinch is associated with a hit location on a user interface that is within a check zone. A relatively small/narrow check zone (e.g., a sphere with 35 cm radius) around an interaction pose may be used as a check zone. If a gaze location on the UI is outside of the check zone (e.g., sphere), gaze-based hover may be enabled and/or pinch gestures may be routed to the gaze location, i.e., providing an indirect interaction.

In some implementations, trigger (e.g., pinches) and non-trigger (e.g., taps, scrolls, etc.) interactions are treated differently. For example, in the circumstance in which a UI element is close to the user (e.g., a keyboard near the user's resting hand position) and a main user interface is at a further distance, the system may use a check zone 1130 to distinguish trigger gestures (e.g., pinches) so that the user, for example, only performs direct pinch interactions on the proximate UI element (e.g., the keyboard) when the user is looking at or near the proximate UI element. In contrast, the system may not use the check zone for non-trigger interactions sot that the user, for example, can perform a direct non-trigger gesture (e.g., tap, scroll, etc.) on the proximate UI element even when the user is not looking at or near the proximate UI element.

A check zone may be used to both (a) determine whether to handle a trigger gesture (e.g., pinch) as either a direct trigger gesture (e.g., direct pinch) and indirect trigger gesture (e.g., indirect pinch) and/or (b) provide appropriate hover feedback/state (e.g., providing direct hover feedback/state (e.g., based on gaze) and/or indirect hover feedback/state (based on finger location proximity to UI).

Figure 11D:
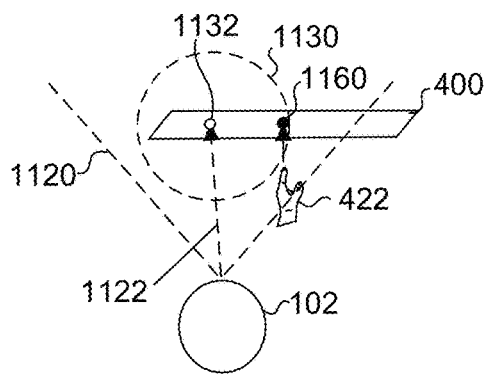
Figure 11E:
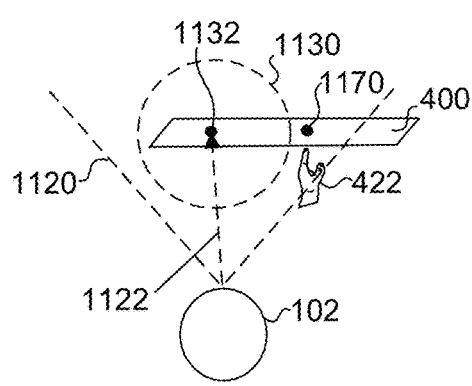

FIG. 11D-E illustrate an example of hover feedback/state determination.

In these examples, an attention zone 1120 and/or check zone 1130 are generated and used to accurately respond to gaze and hand activity. In this example, the attention zone 1120 is a cone formed around ray 1122. In this example, the check zone 1130 is sphere centered around a position 1132 at which the user's gaze ray intersects the user interface 400. To interpret the user action (i.e., gazing at location 1132 while positioning hand 422 proximate location 1160, the system determines whether a location associated with a direct interaction (e.g., the location 1160) is within the check zone 1130. If the location is within the check zone (as shown in FIG. 11D), gaze hover is disabled, i.e., the UI element at position 1132 is unhovered. In this example, the UI element at the location 1160 associated with the direct interaction is hovered.

In contrast, if the location associated with the direct interaction is outside of the check zone (as shown in FIG. 11E), gaze hover is enabled, i.e., the UI element at position 1132 is hovered. In this example, the UI element at the location 1160 associated with the direct interaction also remains hovered. Such criteria may prevent potential confusion (that might otherwise occur) due to direct hover and indirect hover feedback being too close together (e.g., two different keys highlighted on a virtual keyboard). Once the user gazes away (outside of check zone 1130), the gaze hover reappears (as illustrated in FIG. 11E), indicating to the user that a pinch would be sent to/associated with an indirect interaction at the gaze location, i.e., location 1132. Thus, in FIG. 11D, if the user were to pinch, the pinch would be a direct interaction at location 1160 and, if the user were to tap, the tap would be a direct interaction at location 1160. In FIG. 11E, if the user were to pinch, the pinch would be an indirect interaction at location 1132 and, if the user were to tap, the tap would be a direct interaction at location 1170.

Hover Permanence

Figure 12A:
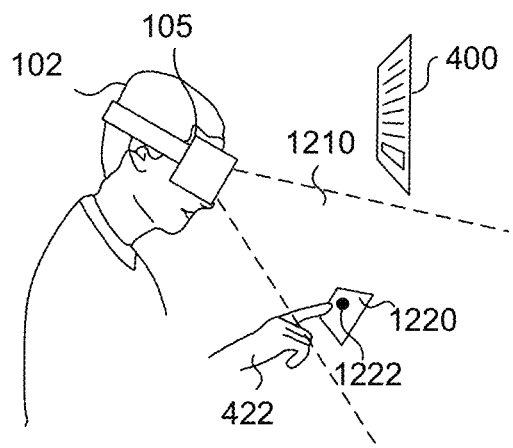
FIG. 12A-D illustrate responding to direct and indirect interactions, in accordance with some implementations.
Figure 12B:
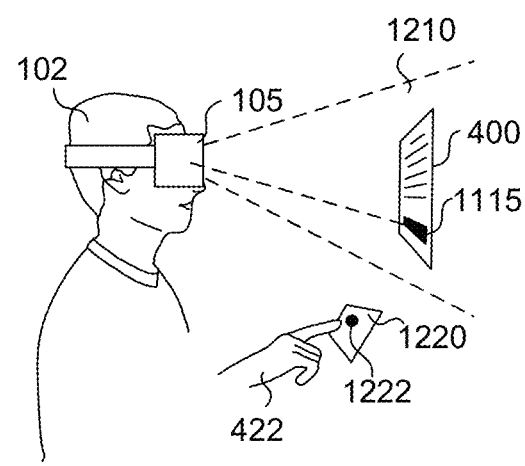

FIGS. 12A-D illustrate hover permanence. In FIG. 12A an attention zone 1210 is determined based on the user interest direction (e.g., based on gaze direction and/or head pose direction). Based on the user interface button 1222 of user interface element 1220 being within attention zone 1210 and the hand 422 of the user 102 being proximate the button 1222, the button 1222 is hovered, e.g., provided with hover feedback and/or in a hover state. Following FIG. 12A, the user 102 looks up from the user interface element 1220 to user interface 400, as shown in FIG. 12B. The hovered state/feedback of button 1222 is maintained even though button 1222 is no longer in attention zone 1210 based on determining that the position of hand 422 remains proximate the already-hovered button 1222, the initial hover determination is permanent in the sense that it is maintained when the looks away so long as the hand 422 remains proximate the already-hovered button 1222. Moreover, the system identifies that the user is gazing at UI feature 1115 and determines to provide gaze hover feedback for that UI feature 1115. Thus, at the same time, finger-hover feedback is provided for button 1222 and gaze-hover feedback is provided for UI feature 1115.

Figure 12C:
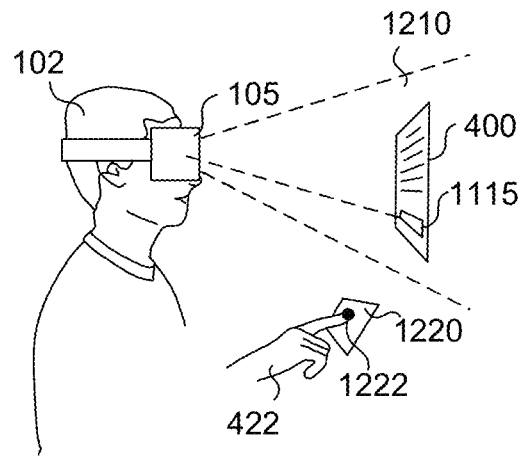
Figure 12D:
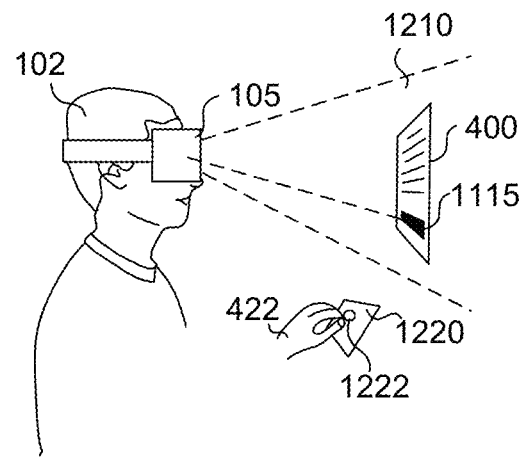

Such dual feedback can indicate to the user how various further interactions will be handled, e.g., how trigger (e.g., pinch) and non-trigger (e.g., tap, scroll, etc.) gestures will be handed. Moreover, the state of the UI components (e.g., hovered or not) may determine how user activity is interpreted. In the examples of FIGS. 12C-D, trigger and non-trigger gestures are handled differently given the state of the UI components. In this example, the system responds to a non-trigger gesture (e.g., a tap) on hovered button 1222 (as illustrated in FIG. 12C) as a direct interaction with button 1222. In contrast, the system responds to a trigger gesture (e.g., a pinch) on hovered button 1222 (as illustrated in FIG. 12D), as an indirect interaction based on the gaze direction, i.e., with UI feature 1115. Thus, in the examples of FIGS. 12C-D, if a user hovers a finger over a button and then looks away and pinches, the pinch will be routed as an indirect interaction. However, the user is still enabled to look away and perform non-trigger direct touch interactions.

Figure 13:
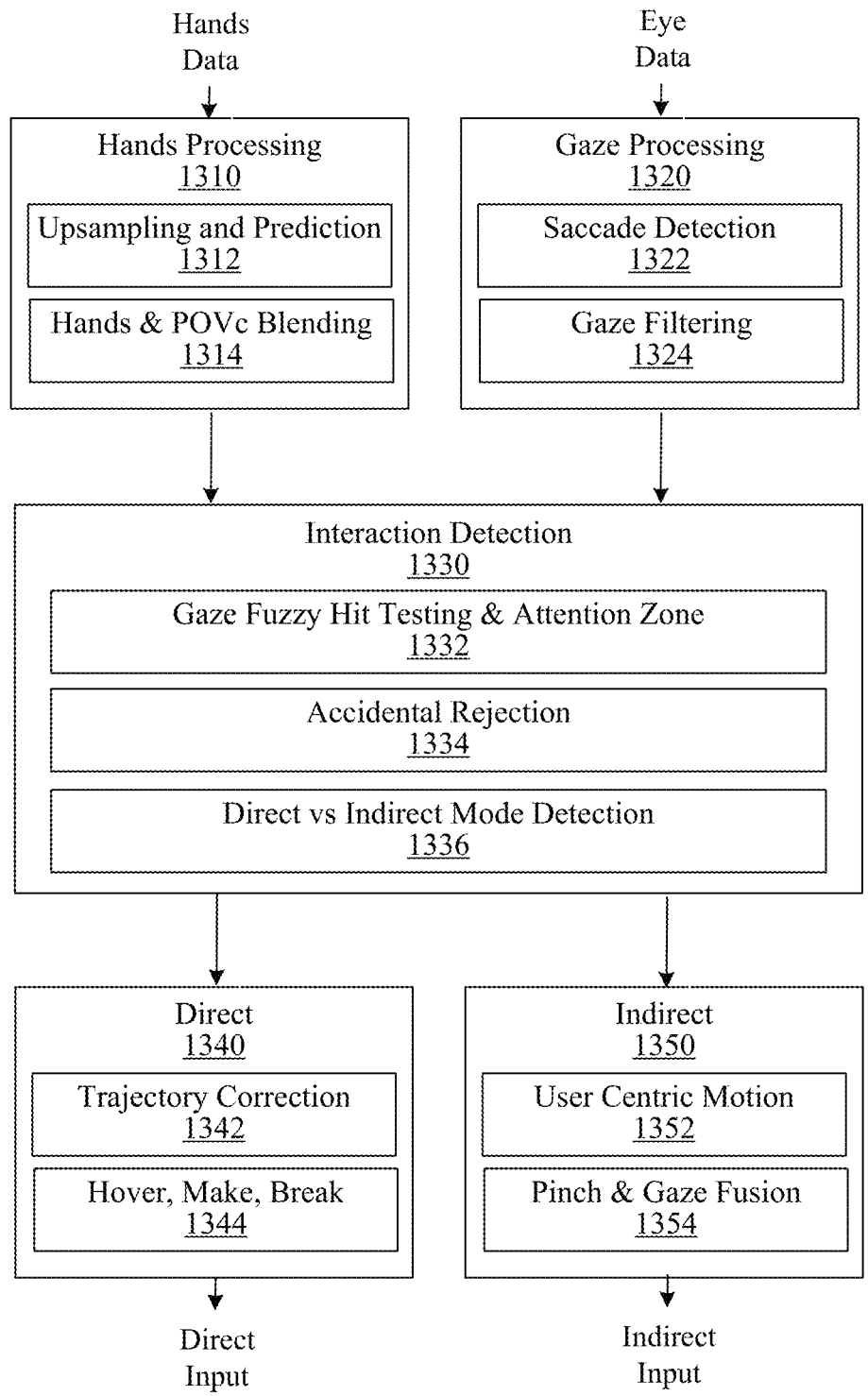
FIG. 13 is a process flow chart illustrating an exemplary process using hands and eye data to provide direct and indirect input, in accordance with some implementations.

FIG. 13 is a process flow chart illustrating an exemplary process using hands and eye data to provide direct and indirect input. In this example, hands data (e.g., "Hands Data") is input to hands processing block 1310. An upsampling and prediction block 1312 up-samples the hands data (e.g., adding more frames) and makes predictions about future hand locations, paths, trajectories, speeds, accelerations, etc. In some implementations, at a hands input process, the internal states of an upsampler are updated with new observation data from a hands computer-vision-based tracking system. At an interaction detection process, data is received about when the next frame will be rendered, it computes an interpolation/prediction timestamp and queries the upsampler for joints data corresponding to that timestamp. These steps may occur asynchronously and/or at different frame rates. The process may often query upsamples for several predictions at different timestamps in between updates from the computer vision tracking system, e.g., hand tracking may runs at 30 Hz while the display may renders at 90 Hz.

The hands and point of view correction (POVc) blending block 1314 may use corrected and uncorrected hand joint data to mitigate POVc-coupled hand jumps, e.g., that may occur due to background depth and camera switching. The Hands and POVc blending block may compute new hand pose information to address discrepancies between the location of the user's hands in the real world (e.g., tracked by computer vision system), and where the hands appear to be located from the perspective of the user looking at the display. The algorithm may smoothly blend the real & POV-corrected versions of the hand skeleton to create hand pose information that is optimized for input recognition in usage contexts where hand registration to UI is important (e.g. during direct input, where a finger must line up with a button). When a user's hands are outside of a user's field of view (FOV) and/or the view of the sensors, it may be undesirable to expend resources or may not otherwise be possible to provide corrections, resulting in jumps in hand position. The process may include smoothly blending hands data over time, for example, based on whether the user is in a direct or indirect mode, whether the hand is near a UI element or not, or other factors.

The eye data (e.g., "Eye Data") is input to a gaze processing block 1320. The saccade detection block 1322 removes saccades, blinks, and/or other gaze-loss events (e.g., leaving only segments of gaze corresponding to fixations). An example saccade detection process may use gaze confidence, tracking state, pupil center, pupil diameter, inter-pupillary distance (IPD), gaze ray data, and velocity data to detect saccades and blinks for removal and/or identify fixations for gaze interactions. It may distinguish between gaze events that are fixations and gaze events that are saccades to facilitate more accurate gaze-based input. The gaze filtering block 1324 filters and/or smooths the gaze data signal. This may involve smoothing the gaze data during the fixations. Filtering may be tightly coupled to the gaze motion classification. The gaze processing block 1320 may lock/remember the last smoothed gaze location for those interim periods or may leverage additional algorithms/policies to "fill in" the data in between the fixations.

The processed hands and eye data are provided to the interaction detection block 1330, as shown in FIG. 13. Note that the interaction detection block 1330 may additionally use UI geometry data including data about an application's user interface (e.g., an appearance of the user interface, locations of user interface elements within the user interface, behaviors (e.g., interactivity) of the user interface elements within the user interface, etc.). The UI geometry data may be provided at a different rate than the hands and/or eye data. In one example, UI data is received at a first rate (e.g., 90 fps) while hands and gaze data are received asynchronously at slower average rates (e.g., at 60 fps). The interaction detection block 1330 may additionally use frame target time, e.g., the system's prediction of when this frame will be rendered. The interaction detection block 1330 may run asynchronously, e.g., as UI updates and/or gaze/hands data are received. In some implementations, as discussed below, the interaction detection block 1330 includes a gaze fuzzy hit testing and attention zone block 1332, an accidental rejection block 1334, and a direct versus indirect mode detection block 1336.

The gaze fuzzy hit testing and attention zone block 1332 block identifies virtual elements (e.g., UI elements) that the user gaze is considered to be associated with (e.g., directed at) and an attention zone, e.g., based on head or device orientation/direction. An example gaze fuzzy hit testing process may include using gaze ray data, confidence data, gesture data (e.g., hand motion classification), fixation cluster spread data, etc. to loosen/tighten a gaze area/cone-case (e.g., attention zone) based on precision of gaze tracking and/or user behavior. This process may include utilizing UI geometry from a system process that is based on UI information provided by one or more applications, e.g., identifying interaction targets (e.g., which UI elements to associate with a given user activity) based on the 3D representation of UI elements. Use of such UI information may facilitate more accurate hit testing. In addition to UI geometry, fuzzy hit testing can query more detailed data, e.g., about remote effects, gestures, or other context.

The accidental rejection block 1334 identifies hand & gaze behavioral instances that were rejected (i.e., associated with subconscious user behaviors that are not intentional interactions) but that are nonetheless still to be associated with virtual elements in appropriate conditions. The accidental rejection block 1334 attempts to understand the intent behind user motion to better interpret that motion, e.g., as an intentional UI element interaction or something else. An example accidental rejection process may use hand joint data, interaction state history, gaze attention zone data, occlusion data, etc. to reject (or cancel) unintentional user interactions. This process may include utilizing UI geometry from a 3D simulation system that is based on UI information provided by applications, e.g., distinguishing user intentional activity from accidental activity based on the UI elements that are nearby. Use of such UI information may facilitate more accurate accidental rejection. For example, user motion in a Z direction may be identified as accidental based on determining (from application declared data) that the application's UI is 2D/planar and thus that the motion in the Z direction is unlikely to be intended input directed to the UI, i.e., it is likely accidental motion not intended to trigger UI interaction, and thus an input support process may be more confident in rejecting the user activity as accidental.

Some implementations support two interaction modes (e.g., a direct interaction mode and an indirect interaction mode). Some implementations support other combinations of interaction modes (e.g., a direct interaction mode, an indirect interaction mode, a gaze-only interaction mode, and/or peripheral device interactions). Processes may be used to determine which, if any, of several interaction models the user is performing. This may involve recognizing and ignoring accidental behavior and also disambiguating which interaction model is intended when the user wants to interact intentionally. In this example, the direct versus indirect mode detection block 1336 uses the processed hands and eye data to determine an interaction mode for interpreting user activity, e.g., selecting a direct interaction mode or an indirect interaction mode, as previously discussed herein.

If a direct interaction mode is selected, the hands and eye data (processed and/or unprocessed) is provided to direct interaction recognition block 1340, which provides direct input to the user interface. In some implementations, the direct interaction recognition block 1340 includes a trajectory correction block 1342 and a hover, make, break block 1344. The trajectory correction block 1342 may adjust the trajectory of a user motion, e.g., adjusting a user hand motion to account for user behavior in 3D environments, e.g., to make the motion data better correspond to the user's intended motion/intended interactions. The hover, make, break block 1344 may perform various recognition processes using a hand gesture, motion path, velocity, acceleration, etc. to identify certain types of direct interactions with a user interface element, such as a "hover" interaction based on detecting that a hand/finger is proximate but not touching a user interface element, a "make" interaction based on detecting a point (in 3D space/time) that a hand/finger has made contact with a user interface element, a "break" interaction based on detecting a point (in 3D space/time) that a hand/finger has stopped contacting a user interface element, etc.

Numerous types of direct interactions may be recognized and provided as user input. In another example, a direct interaction is recognized by recognizing that the user makes contact with a slider bar user interface element, moves the hand left a distance "X" while making contact with the slider bar, and then retracts their hand (e.g., moves their hand away from the slider bar user interface element) to break contact with the slider bar. The slider bar may be moved left based on this input, e.g., by a distance X. In another example, the user makes a similar motion to provide input imparting a velocity on a user interface element, e.g., providing 3D swipe gesture through on a user interface to cause the user interface to begin moving and continue moving after the hand breaks contact where the continued motion is based on a velocity having been imparted on the UI object, e.g., analogous to when a user swipes up on a multi-touch interface of a mobile phone.

If an indirect interaction mode is selected, the hands and eye data (processed and/or unprocessed) is provided to indirect interaction recognition block 1350, which provides indirect input to the user interface. In some implementations, the indirect interaction recognition block 1350 includes a user centric motion block 1352 and a pinch and gaze fusion block 1354. User centric motion block 1352 accounts for user centric motion in the hands data (e.g., accounting for the fact that the user may be making motions that pivot around a rotation point, e.g., a shoulder, elbow, wrist, etc.). User centric motion block 1352 may be used to map user hand motion into an object or affordance separate from the hand, e.g., an affordance displayed on application content.

The pinch and gaze fusion block 1354 determines which gaze data to associate with a user activity indicative of an intention to interact with a UI element, such as a pinch gesture. Numerous types of indirect interactions may be recognized and provided as user input. In one example, a user pinches fingers together and moves the pinched hand while gazing at a UI element to provide movement input directed to that UI element. In another example, a user pinches and releases the fingers quickly while gazing at a UI element to provide selection events (e.g., analogous to touch screen tap or mouse click input events).

An input support process as illustrated in the example of FIG. 13 may perform one or more core functions. In some implementations these functions include, but are not limited to, obtaining gaze data and associating a user's gaze with UI elements associated with one or more applications. Doing so may involve performing a fuzzy hit testing process. Doing so may involve creating an attention zone. An attention zone can be thought of as a spatial zone/area. It is possible for larger objects to be partially inside/partially outside an attention zone, such that the system needs to test where on the object the user was interacting to understand if an interaction point was inside the user's attention zone. An attention zone may include some or all portions of a set of zero or more UI elements that the user is likely giving attention to at a given time. An attention zone may be used to disambiguate between interaction types (e.g., direct or indirect input modalities), disambiguate which application a user is interacting with, and/or disambiguate which UI elements are the targets of the user's intentions to interact with UI elements.

In some implementations, an input support process relies heavily upon a simulation system to provide a geometric representation of a user interface for hit testing against hands and gaze data. An input support process may use a collision world (e.g., 3D geometry abstractions) provided by the simulation system. An input support process may use user interface metadata information (e.g., UI priority, hierarchical display ordering, transparency information, etc.) to facilitate appropriate UI target selection. An input support process may utilize a separate hit-testing process that produces 3D world hit test results. An input support process may utilize a hit testing process that uses an application-provided hierarchical tree (e.g., declaring UI elements, relationships, and/or rendering information for example regarding what regions are transparent, rendered on top, etc.).

In some implementations, an input support process performs the functions illustrated in FIG. 13 to provide an input support process that produces data for an application. The input support process may produce an interaction state for one or more UI elements, such as identifying whether an interaction is direct or indirect, whether an interaction is a hover/close proximity interaction (e.g., associated with user activity not linked to UI interaction behavior) or gesture/pinch/touch interaction (e.g., associated with user activity indicating UI intentional behavior).

In some implementations, an input support process includes providing an interaction pose, e.g., a trajectory corrected point on a UI element configured to drive a touch-screen tap type of input.

In some implementations, an input support process includes providing a manipulator pose, e.g., corresponding to a position and/or orientation of the hand itself. A manipulator pose may provide a 3D location of a stable hand center or pinch centroid (e.g., based on a contact of two fingers of the hand). A manipulator pose may provide position and/or orientation of a manipulator driving the interaction, e.g., for direct touch interactions, providing the index fingertip information (e.g., location) and, for indirect pinch interactions, providing pinch information (e.g., pinch centroid).

In some implementations, an input support process includes providing an active target (e.g., UI element).

In one example, a user initiates an interaction by pinching while gazing at a UI element. The application receives an interaction pose on the UI element and recognizes the user's intent to interact with the UI element. The user continues pinching and moves their hand to the left. The application receives more interaction poses, such as a set of positions on the user interface based on the moving 3D positions of the hand as it moves left, and responds by moving the associated UI element to the left. In this example, by pinching while gazing at a UI object and then moving the pinched hand to the left, the user provides input that the application can recognize to move the object to the left. The application is able to respond accordingly without needing to receive (and without actually receiving) information about the user's gaze directions and/or specific hand characteristics. In this example, the application receives only interaction pose data and thus may be an application capable of only receiving interaction pose data as a proxy for touch input data. The application may additionally or alternatively be provided with manipulator pose data, e.g., of the 3D positions of the hand as it moves left and may determine the motion of the associated object based on the changing manipulator pose position. The application may be provided with user change-based information, e.g., accelerated user-centric deltas providing delta-updates similar to a trackpad communicating the amount the user has moved from frame-to-frame, rather than an absolute position. Communicating changes, e.g., via a separate API, may helps us optimize one set of signals to accurately represent motion (e.g., for scrolling) separate from signals that also need to be absolute-position-accurate (e.g. for drawing).

In some implementations, an input support process includes receiving a gaze direction that could potentially be associated with different UI elements, e.g., because the gaze direction is between the UI elements or because the UI elements overlap one another. Fuzzy hit testing and other such processes discussed above may help disambiguate user intention to identify an appropriate UI element in such cases.

In some implementations, an input support process includes recognizing two-handed 3D gestures, e.g., a two-handed zoom gesture, and provides information to an application that corresponds to multi-touch touch screen input gestures. Doing so, for example, may involve generating an interaction pose for each hand that can be interpreted by an application's 2D touch-based gesture recognition processes as two touch points moving closer to or farther from one another, which may be interpreted as a pinch-to-zoom touch-screen gesture (e.g., zooming in or out of a user interface).

In some implementations, an application is developed for use on a mobile platform that uses single and/or multi-touch input gestures. The application may be developed by the application developer including calls to a gesture API and then specifying what to do on certain types of touch events, e.g., do "X" on a tap event, "Y" on a swipe event, etc. It may be desirable to use such applications on a new or different platform that offers input modalities different than (or in addition to) single and/or multi-touch input gestures. Rather than implementing all new 3D gestures and gesture recognition processes within the application, some implementations disclosed herein interpret 3D user activity (e.g., hand positions, gaze directions, etc.) and send proxy data to the application corresponding to where a touch would be if the 3D user activity had been performed as a 2D touch input gesture. An input support process may provide such proxy data to such applications and, in doing so, enable a large universe of existing 2D/touch-based applications to be easily imported and used within a new 3D system that uses new and different 3D user activity-based inputs. An input support process may make additional information available so that newer/modified application can take advantage/use more information about the user's 3D activity. Alternatively, this information may be leveraged by an old unmodified application that is linking against XR-compatible versions of UI frameworks, which can under-the-hood take advantage of this extra data on the app's behalf (e.g., a binary compatible app using a standard long press recognizer can benefit from an XR-based OS implementation that uses z-depth of the touch to more accurately recognize long press than a native 2D-only approach).

In some implementations, to enable use of both legacy 2D/touch-based applications and newer applications with additional, 3D recognition capabilities, the input support process may provide multiple types of information, such as interaction pose data to support touch-based input recognition by a legacy application as well as manipulator pose data to support applications with additional, 3D recognition capabilities.

Interpreting 3D user activity as 2D touch-based activity can require overcoming various challenges. For example, a user's hand movement in 3D space when performing a touch gesture may be equated with a touch-screen tap gesture but may lack the precision expected for a touch-screen tap gesture. A touch on a touch screen involves contact with a physical surface that stops the finger while a motion "virtually" touching a UI in a 3D XR environment may involve the user's hand poking through the UI element (e.g., as similarly illustrated in view 210b of FIG. 2). A user may intend to tap the surface of a virtual button but actually poke through the surface at one position and then retract the hand/finger at a slightly different position. This user activity involving two different UI element positions (e.g., a first entry position and a second exit position relative to the UI element) can be interpreted (by an input support process) as a tap at a single point using various algorithms and/or machine learning processes, e.g., performing a trajectory correction. The application receives the single location (from the input support process) and recognizes it as a touch event. Thus, an input support process may classify and/or interpret user activity to account for unique circumstances of interacting within a 3D environment and package the data provided to the application so that the application does not need to itself distinguish between the action intended by the user and the action actually performed by the user.

An input support process may account for sensor inaccuracy/limitations, such as accounting for the fact that gaze direction that are identified may differ from actual gaze directions, in providing data to applications. The applications need not account for such inaccuracies themselves.

In formatting the data for the application in a format the application will understand, an input support process can resolve ambiguities, account for inaccuracies, and/or repackage input provided in an input modality that the application does not/need not itself understand into a format that the application does recognize.

In short, an input support process may perform various processes that interpret raw 3D data for consumption by applications so that the applications (and their developers) need not perform those processes via manually-programmed processes. Additionally, performing such processes by a shared OS process can unify the input experience across all apps so that users receive consistent UI response behavior.

Moreover, a shared input support process (e.g., used by multiple applications) may enable multiple interaction modalities, e.g., that provide different ways of a user selecting a button, and abstract the user activity data associated with those different modalities for the same types of interactions to provide that same data to the application for different types of input. The input modalities can thus be changed and/or added to over time without requiring changes to the applications, so long as the input support process can abstract the new or changed input modality user activities to the format understood by the applications.

In some implementations, an application utilizes a gesture recognizer that runs within the application process. The gesture recognizer may include a state machine that classifies inputs that are received in a stream of input data, e.g., a tap has started, a tap is ongoing, a tap has ended. An input support process may provide data to the application that are recognized by the gesture recognizer running within the application process as particular types of input, e.g., taps, that may correspond to a single input modality specific to the application, such as a touch-based input modality. The input support process may configure the data provided to the application to ensure that the application's process recognizes the user activity accurately, e.g., by providing data in a form that the gesture recognizer expects. In one example, the input support process converts user activity involving a user gaze and a hand gesture to data that can be recognized as touch input. In another example, the input support process converts user activity involving a 6DOF controller and a gaze direction to data that can be recognized as touch input.

An application developer need not write an application for different input modality platforms. Rather an application developer can write an application for a touch platform (or a generic 2D input modality) and the application may be imported with little or no effort to work within a 3D user activity platform. A single application may be used on mobile devices, laptop devices, tablet devices, desktop devices, and 3D XR devices. The techniques disclosed here can enable binary-code compatibility, i.e., an application being executable in different environments that utilize different input modalities.

In some implementations, an input support process provides a gesture flag and/or gesture classification to an application, e.g., indicating to the application that the user has raised their hand or recognizing that a particular gesture is a tap, swipe, scroll, etc. as a hint that the application can use in recognizing the gesture.

In some implementations, an input support process facilitates an application recognizing gaze-only input without providing raw gaze data to the application. This may involve periodically providing gaze data (i.e., the location on a UI element that the user is gazing at). Gaze-only data may be associated with an interaction state and data provided to the applications based on gaze-only data only when the gaze data is associated with a particular interaction state, such as providing data when a gaze-hover state is applicable. Such data may be provided only based on express user authorization. For example, when a user stares at a UI element for more than a threshold amount of time (e.g., 0.01, 0.1, 0.5, 1, 2, 3, 4, 5, etc. seconds) the application may be notified and an affordance may be displayed (e.g., a dot). If the user then looks at the affordance, the application may be notified that the stared at UI element has been hit/selected. In another example, a stare at a point within a UI element for more than a threshold amount of time may trigger a hover feedback, which may be handled out of process or by the application. A gaze-only input modality may be another input modality that is abstracted into data provided to an application such that the application can interpret the input, e.g., using a generic or touch-based gesture recognition process.

In some implementations, an input support process determines an interaction state for each hand (e.g., direct versus indirect) and/or an interaction state associated with a user gaze (e.g., gaze only or not gaze only).

Figure 14:
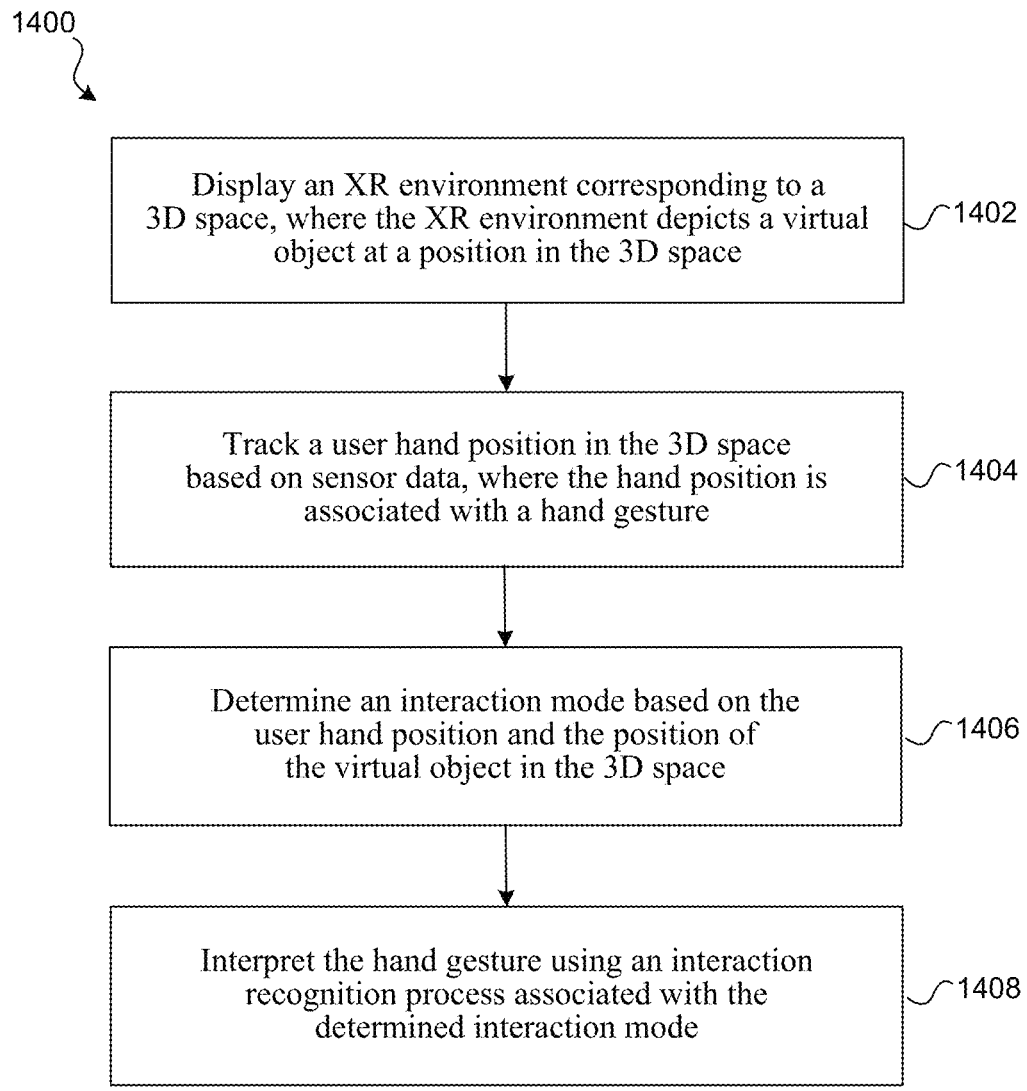
FIG. 14 is a flowchart illustrating a method for interpreting user activity as user interactions with virtual elements positioned within in a 3D space, in accordance with some implementations.

FIG. 14 is a flowchart illustrating a method 1400 for interpreting user activity as user interactions with virtual elements positioned within in a 3D space. In some implementations, a device such as electronic device 105 or electronic device 110 performs method 1400. In some implementations, method 1400 is performed on a mobile device, desktop, laptop, HMD, or server device. The method 1400 is performed by processing logic, including hardware, firmware, software, or a combination thereof. In some implementations, the method 1400 is performed on a processor executing code stored in a non-transitory computer-readable medium (e.g., a memory).

At block 1402, the method 1400 includes displaying an XR environment corresponding to a 3D space, where the XR environment comprises depicts a virtual object at a position in the 3D space. The virtual object may be a user interface element such as a button, icon, text entry field, slider bar, or menu item, that is presented as part of a virtual UI displayed at a fixed position or otherwise within the XR environment, e.g., a virtual 2D menu with buttons displayed a few feet in front of the user in XR.

At block 1404, the method 1400 includes tracking a user hand position in the 3D space based on sensor data. This may involve obtaining user position data corresponding to a 3D position of a portion (e.g., finger/hand) of a user in the 3D space. The user position data may be obtained based on sensor data (e.g., image sensor, depth sensor data, motion sensor data, etc.) and may provide a path of the portion of the user over a time period. In one example, the user position data may be a skeleton representation of the user generated periodically, e.g., 30 fps, based on outward facing image/depth sensors on an HMD. Such user position data may provide a path of a portion of the skeleton (e.g., a finger skeleton portion). In other words, for example, by tracking the orientation of the skeleton over multiple instants in time, a path of a finger portion of the skeleton over time relative to a 3D space may be determined.

In some implementations, the portion of the user corresponds to a point on or in a finger of the user. The portion of the user may correspond to a point on or in a hand of the user. The user position data may correspond to a position within a skeleton representation of the user that is generated periodically, e.g., at multiple points in time during a period of time.

At block 1406, the method 1400 includes determining an interaction mode based on the user hand position and the position of the virtual object in the 3D space. Determining the interaction mode comprises selecting whether the interaction mode is direct or indirect based on the user hand position and the position of the virtual object in the 3D space. Determining the interaction mode may involve selecting a direct interaction mode based on the hand position intersecting a 3D area associated with the virtual object in the 3D space. Determining the interaction mode may involve selecting an indirect interaction mode based on the hand position being outside of a 3D area associated with the virtual object in the 3D space.

At block 1408, the method 1400 includes interpreting the hand gesture using an interaction recognition process associated with the determined interaction mode. In some implementations, the method involves tracking a position of the hand gesture in the 3D space and identifying one or more interaction points based on the tracking. The method may involve identifying the one or more interaction points based on a gaze direction.

In some implementations, determining the interaction mode comprises selecting a direct interaction mode in which the virtual element is identified based on the hand position intersecting a 3D area associated with the virtual object in the 3D space, and the interaction recognition process is a direct interaction recognition process applied to the hand gesture. Determining the interaction mode may involve selecting a direct interaction mode based on: determining an attention zone based on a gaze direction or head pose of the user; determining an intersection of the hand position intersecting a 3D area associated with the virtual object in the 3D space; and determining that the intersection is within the attention zone. In some implementations, the interaction mode is a direct interaction mode and the method 1400 includes discontinuing interaction detection for a predetermined period of time (e.g., 0.1, 1, 2, 4, 5, 10, 15, etc. seconds) following a recognition of the hand gesture.

Some implementations initiate a selection of the virtual object based on interaction mode being a direct interaction mode and the hand gesture being a direct touch with the virtual object. Some implementations initiate a hover of the virtual object based on interaction mode being a direct interaction mode and the hand position being proximate to the position of the virtual object and within an attention zone. The hover may be an interaction analogous to a mouse or cursor hover in a traditional computing (e.g., desktop, laptop, etc.) environment in which a cursor is positioned above or on a UI element without an activation or selection command during which hover feedback may be provided, e.g., highlighting or otherwise distinguishing the element. The hover of the virtual object may be automatically maintained when the position of the virtual object is no longer in the attention zone, e.g., for a predetermined period of time, such as 10 seconds, 30 seconds, etc.

In some implementations, determining the interaction mode comprises selecting an indirect interaction mode in which the virtual element is identified based on a gaze direction intersecting an area associated with the virtual object, and the interaction recognition process is an indirect interaction recognition process applied to the hand gesture. Determining the interaction mode may involve selecting an indirect interaction mode based on: determining an attention zone based on a gaze direction or head pose of the user; determining an intersection of the hand position intersecting a 3D area associated with the virtual object in the 3D space; and determining that the intersection is outside of the attention zone.

Some implementations initiate a selection of the virtual object based on interaction mode being an indirect interaction mode and the hand gesture being a pinch occurring while a gaze is directed towards the virtual object. In some implementations, the interaction mode is an indirect interaction mode and interpreting the hand gesture comprises: recognizing that the hand gesture is a pinch; and identifying the virtual object based on a gaze direction occurring during the pinch. In some implementations, the interaction mode is an indirect interaction mode and interpreting the hand gesture comprises: recognizing that the hand gesture corresponds to hand engagement; identifying the virtual object based on a gaze direction occurring during the hand engagement; and initiating a hover of the virtual object based on the hand engagement.

In some implementations, the method 1400 is performed by an electronic device that is a head-mounted device (HMD) and/or the XR environment is a virtual reality environment or an augmented reality environment.

In some implementations, a system or method detects, for or in indirect mode, when the user is resting their hand (or arm) on their lap, an, armrest of the chair they are sitting on, or another physical object. The user's hand or arm being supported by another physical object may be used to determine to use an indirect interaction mode and/or to determine how interpret hand gestures performed by the hand.

In some implementations, a method is performed by executing instructions (e.g., stored in a non-transitory computer-readable medium). The method may obtain a user hand position in a 3D space based on sensor data, wherein the hand position is associated with a hand gesture. The method determines that an arm or hand associated with the hand position is supported by (e.g., resting on) a physical object (e.g., the user's lap, the user's leg, an arm rest, etc.). In accordance with determining that the arm or hand is supported by the physical object, the method interprets the hand gesture using an interaction recognition process associated with an indirect interaction mode. The hand gesture may be interpreted as a user interaction in an extended reality (XR) environment corresponding to the 3D space.

Determining to utilize the indirect interaction mode may be based on determining that the arm or hand is supported by the physical object. The method may initiate an action (e.g., a selection of a virtual object) based on recognizing a hand gesture, e.g., based on recognizing the hand gesture occurring while a gaze is direct towards the virtual object.

In the indirect interaction mode, a virtual element may be identified based on a gaze direction intersecting an area associated with the virtual object.

An interaction recognition process is an indirect interaction recognition process applied that identifies a hand gesture. In some implementations, recognizing the hand gesture involves recognizing a pinch.

In some implementations, the method determines that the arm or hand associated with the hand position is supported by the physical object is based on determining a first position of the arm or hand, determining a second position of the physical object, and determining that a relationship between the first position and second position satisfy a criterion, e.g., determining that skeleton representation of a user's hand is within a threshold distance of a surface of the physical object, e.g., based on image data, depth data, etc.

In some implementations, the method 1400 provides data corresponding to user activity to an application. The data may enable the application to interpret the user activity. The data may be specific to the interaction mode. In one example, for a direct interaction mode, the data comprises an index fingertip as a manipulator pose and a trajectory corrected interaction pose, e.g., a direct-touch specific trajectory correction may be applied to an interaction pose. In another example, for an indirect interaction mode, the data comprises a pinch centroid as a manipulator pose and an interaction pose or user-centric data. This may involve run a different signal chain to generate interaction pose and other indirect-specific "user centric deltas."

Figure 15:
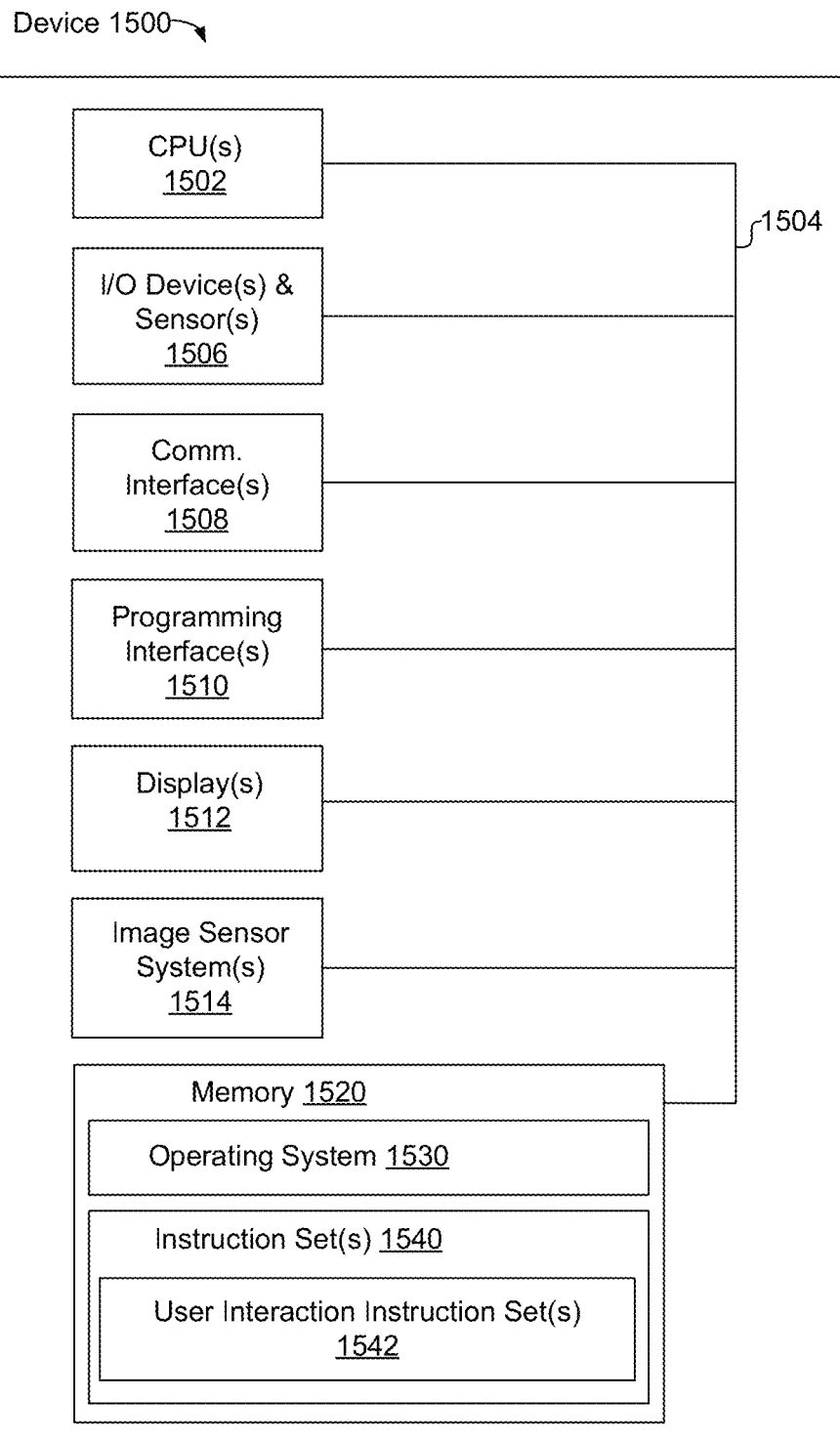
FIG. 15 is a block diagram of an electronic device, in accordance with some implementations.

FIG. 15 is a block diagram of electronic device 1500. Device 1500 illustrates an exemplary device configuration for electronic device 105 or 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1500 includes one or more processing units 1502 (e.g., microprocessors, ASICs, FPGAs, GPUs, CPUs, processing cores, and/or the like), one or more input/output (I/O) devices and sensors 1506, one or more communication interfaces 1508 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, and/or the like type interface), one or more programming (e.g., I/O) interfaces 1510, one or more output device(s) 1512 (e.g., including displays), one or more interior and/or exterior facing image sensor systems 1514, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1512 include one or more displays configured to present a view of a 3D environment to the user. In some implementations, the one or more displays correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1500 includes a single display. In another example, the device 1500 includes a display for each eye of the user.

In some implementations, the one or more output device(s) 1512 include one or more audio producing devices. In some implementations, the one or more output device(s) 1512 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1512 may additionally or alternatively be configured to generate haptics.

In some implementations, the one or more image sensor systems 1514 are configured to obtain image data that corresponds to at least a portion of a physical environment. For example, the one or more image sensor systems 1514 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1514 further include illumination sources that emit light, such as a flash. In various implementations, the one or more image sensor systems 1514 further include an on-camera image signal processor (ISP) configured to execute a plurality of processing operations on the image data.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 comprises a non-transitory computer readable storage medium.

In some implementations, the memory 1520 or the non-transitory computer readable storage medium of the memory 1520 stores an optional operating system 1530 and one or more instruction set(s) 1540. The operating system 1530 includes procedures for handling various basic system services and for performing hardware dependent tasks. In some implementations, the instruction set(s) 1540 include executable software defined by binary information stored in the form of electrical charge. In some implementations, the instruction set(s) 1540 are software that is executable by the one or more processing units 1502 to carry out one or more of the techniques described herein.

The instruction set(s) 1540 include user interaction instruction set(s) 1542 configured to, upon execution, identify and/or interpret user gestures and other activities as described herein. The instruction set(s) 1540 may be embodied as a single software executable or multiple software executables.

Although the instruction set(s) 1540 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor:
obtaining a position of a virtual object in an extended reality (XR) environment corresponding to a three-dimensional (3D) space;
obtaining a user hand position in the 3D space based on sensor data, wherein the hand position is associated with a hand gesture;
determining an interaction mode based on the user hand position and the position of the virtual object in the 3D space, wherein a direct interaction mode is selected when a relationship between the user hand position and the position of the virtual object in the 3D space satisfies a criterion and an indirect interaction mode is selected when the relationship satisfies a second criterion different than the first criterion; and
interpreting the hand gesture using an interaction recognition process associated with the determined interaction mode, wherein a direct interaction recognition process is used when the direct interaction mode is selected and an indirect interaction recognition process is used when the indirect interaction mode is selected.

2. The method of claim 1,
wherein determining the interaction mode comprises selecting a direct interaction mode in which the virtual object is identified based on the hand position intersecting a 3D area associated with the virtual object in the 3D space, and
wherein the interaction recognition process is a direct interaction recognition process applied to the hand gesture.

3. The method of claim 1, wherein determining the interaction mode comprises selecting a direct interaction mode based on the hand position intersecting a 3D area associated with the virtual object in the 3D space.

4. The method of claim 1, wherein determining the interaction mode comprises selecting a direct interaction mode based on:
determining an attention zone based on a gaze direction or head pose of the user;
determining an intersection of the hand position intersecting a 3D area associated with the virtual object in the 3D space; and
determining that the intersection is within the attention zone.

5. The method of claim 1, wherein the interaction mode is a direct interaction mode and the method further comprises discontinuing interaction detection for a predetermined period of time following a recognition of the hand gesture.

6. The method of claim 1 further comprising initiating a selection of the virtual object based on interaction mode being a direct interaction mode and the hand gesture being a direct touch with the virtual object.

7. The method of claim 1 further comprising initiating a hover of the virtual object based on interaction mode being a direct interaction mode and the hand position satisfying a proximity criterion with respect to the position of the virtual object and within an attention zone.

8. The method of claim 7 further comprising maintaining the hover of the virtual object when the position of the virtual object is no longer in the attention zone.

9. The method of claim 1,
wherein determining the interaction mode comprises selecting an indirect interaction mode in which the virtual object is identified based on a gaze direction intersecting an area associated with the virtual object, and
wherein the interaction recognition process is an indirect interaction recognition process applied to the hand gesture.

10. The method of claim 1, wherein determining the interaction mode comprises selecting an indirect interaction mode based on the hand position being outside of a 3D area associated with the virtual object in the 3D space.

11. The method of claim 1, wherein determining the interaction mode comprises selecting an indirect interaction mode based on:
determining an attention zone based on a gaze direction or head pose of the user;
determining an intersection of the hand position intersecting a 3D area associated with the virtual object in the 3D space; and
determining that the intersection is outside of the attention zone.

12. The method of claim 1 further comprising initiating a selection of the virtual object based on interaction mode being an indirect interaction mode and the hand gesture being a pinch occurring while a gaze is direct towards the virtual object.

13. The method of claim 1, wherein the interaction mode is an indirect interaction mode and interpreting the hand gesture comprises:
recognizing that the hand gesture is a pinch; and
identifying the virtual object based on a gaze direction occurring during the pinch.

14. The method of claim 1, wherein the interaction mode is an indirect interaction mode and interpreting the hand gesture comprises:
recognizing that the hand gesture corresponds to hand engagement;
identifying the virtual object based on a gaze direction occurring during the hand engagement; and
initiating a hover of the virtual object based on the hand engagement.

15. The method of claim 1 further comprising:
identifying a hand gesture;
tracking a position of the hand gesture in the 3D space; and identifying one or more interaction points based on the tracking.

16. The method of claim 15, wherein identifying the one or more interaction points is based on a gaze direction.

17. The method of claim 1, wherein the electronic device is a head-mounted device and the XR environment is a virtual reality environment or an augmented reality environment.

18. The method of claim 1, further comprising providing data corresponding to user activity to an application for the application to interpret the user activity based on the data, wherein the data is specific to the interaction mode.

19. The method of claim 18, wherein for a direct interaction mode, the data comprises an index finger tip as a manipulator pose and a trajectory corrected interaction pose.

20. The method of claim 18, wherein for an indirect interaction mode, the data comprises a pinch centroid as a manipulator pose and an interaction pose or user-centric data.

21. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining a position of a virtual object in an extended reality (XR) environment corresponding to a three-dimensional (3D) space;
obtaining a user hand position in the 3D space based on sensor data, wherein the hand position is associated with a hand gesture;
determining an interaction mode based on the user hand position and the position of the virtual object in the 3D space, wherein a direct interaction mode is selected when a relationship between the user hand position and the position of the virtual object in the 3D space satisfies a criterion and an indirect interaction mode is selected when the relationship satisfies a second criterion different than the first criterion; and
interpreting the hand gesture using an interaction recognition process associated with the determined interaction mode, wherein a direct interaction recognition process is used when the direct interaction mode is selected and an indirect interaction recognition process is used when the indirect interaction mode is selected.

22. The system of claim 21,
wherein determining the interaction mode comprises selecting a direct interaction mode in which the virtual element is identified based on the hand position intersecting a 3D area associated with the virtual object in the 3D space, and
wherein the interaction recognition process is a direct interaction recognition process applied to the hand gesture.

23. A non-transitory computer-readable storage medium storing program instructions executable via one or more processors to perform operations comprising:
obtaining a position of a virtual object in an extended reality (XR) environment corresponding to a three-dimensional (3D) space;
obtaining a user hand position in the 3D space based on sensor data, wherein the hand position is associated with a hand gesture;
determining an interaction mode based on the user hand position and the position of the virtual object in the 3D space, wherein a direct interaction mode is selected when a relationship between the user hand position and the position of the virtual object in the 3D space satisfies a criterion and an indirect interaction mode is selected when the relationship satisfies a second criterion different than the first criterion; and
interpreting the hand gesture using an interaction recognition process associated with the determined interaction mode, wherein a direct interaction recognition process is used when the direct interaction mode is selected and an indirect interaction recognition process is used when the indirect interaction mode is selected.

* * * * *

UNITED STATES PATENT AND TRADEMARK OFFICE
CERTIFICATE OF CORRECTION

Page 1 of 1

PATENT NO. : 12,443,286 B2
APPLICATION NO. : 18/375280
DATED : October 14, 2025
INVENTOR(S) : David J. Meyer et al.

It is certified that error appears in the above-identified patent and that said Letters Patent is hereby corrected as shown below:

In the Claims

Claim 12, Column 32, Line 47 reads:
"...being a pinch occurring while a gaze is direct towards the..."

Should read:
--...being a pinch occurring while a gaze is directed towards the...--

Signed and Sealed this
Second Day of December, 2025

John A. Squires
*Director of the United States Patent and Trademark Office*